United States Patent
Guim Bernat et al.

(10) Patent No.: US 11,374,776 B2
(45) Date of Patent: Jun. 28, 2022

(54) ADAPTIVE DATAFLOW TRANSFORMATION IN EDGE COMPUTING ENVIRONMENTS

(71) Applicant: Intel Corporation, Santa Clara, CA (US)

(72) Inventors: Francesc Guim Bernat, Barcelona (ES); Kshitij Arun Doshi, Tempe, AZ (US); Ned M. Smith, Beaverton, OR (US); Timothy Verrall, Pleasant Hill, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/722,820

(22) Filed: Dec. 20, 2019

(65) Prior Publication Data

US 2020/0128067 A1     Apr. 23, 2020

Related U.S. Application Data

(60) Provisional application No. 62/907,597, filed on Sep. 28, 2019, provisional application No. 62/939,303, filed on Nov. 22, 2019.

(51) Int. Cl.
*H04L 67/141* (2022.01)
*H04L 41/14* (2022.01)
(Continued)

(52) U.S. Cl.
CPC ............ *H04L 9/3297* (2013.01); *G06F 8/443* (2013.01); *G06F 9/3836* (2013.01);
(Continued)

(58) Field of Classification Search
CPC ............ G06F 11/1004; G06F 11/3433; G06F 12/1408; G06F 16/1865; G06F 16/2322;
(Continued)

(56) References Cited

U.S. PATENT DOCUMENTS 10,142,390 B2 * 11/2018 Seedorf ............... H04L 65/1069
10,388,089 B1 *  8/2019 Civgin ................. G07C 5/0816
(Continued)

FOREIGN PATENT DOCUMENTS

DE   112020000054 T5   3/2021
DE   102020208023      4/2021
(Continued)

OTHER PUBLICATIONS

Xu, Xiaodong, "Mobile Edge Computing Enhanced Adaptive Bitrate Video Delivery With Joint Cache and Radio Resource Allocation", IEEE Access Special Section on Mobile Edge Computing, (Sep. 6, 2017), 10 pgs.
(Continued)

*Primary Examiner* — Jonathan A Bui
*Assistant Examiner* — Zonghua Du
(74) *Attorney, Agent, or Firm* — Schwegman Lundberg & Woessner, P.A.

(57) ABSTRACT

Systems and techniques for adaptive dataflow transformation in edge computing environments are described herein. A transformation compatibility indication may be received from a device. A set of transformations available for use by the device connected to the network may be determined based on the transformation compatibility indicator. The set of transformations may be transmitted to the device. A value may be determined for an operating metric for an edge computing node of the network. The edge computing node may provide a service to the device via the network. A transformation request may be transmitted to the device based on the value. The transformation request may cause the device to execute a transformation of the set of transformations to transform a dataflow of the service. The adaptive dataflow transformations may be continuous with changing predicted values of operating metrics.

27 Claims, 9 Drawing Sheets

(51) Int. Cl.

| | | |
|---|---|---|
| *H04L 47/70* | (2022.01) | |
| *H04L 67/12* | (2022.01) | |
| *G06F 8/41* | (2018.01) | |
| *G06F 9/38* | (2018.01) | |
| *G06F 9/445* | (2018.01) | |
| *G06F 9/48* | (2006.01) | |
| *G06F 9/50* | (2006.01) | |
| *G06F 11/34* | (2006.01) | |
| *H04L 67/10* | (2022.01) | |
| *G16Y 40/10* | (2020.01) | |
| *H04L 9/32* | (2006.01) | |
| *H04L 9/40* | (2022.01) | |
| *G06F 12/14* | (2006.01) | |
| *H04L 9/08* | (2006.01) | |
| *G06F 9/455* | (2018.01) | |
| *G06F 16/18* | (2019.01) | |
| *G06F 16/23* | (2019.01) | |
| *G06F 11/10* | (2006.01) | |
| *H04L 9/06* | (2006.01) | |
| *H04L 41/0893* | (2022.01) | |
| *H04L 41/5009* | (2022.01) | |
| *H04L 41/5025* | (2022.01) | |
| *H04L 43/08* | (2022.01) | |
| *H04L 67/1008* | (2022.01) | |
| *G06F 9/54* | (2006.01) | |
| *G06F 21/60* | (2013.01) | |
| *H04L 9/00* | (2022.01) | |
| *H04L 41/0896* | (2022.01) | |
| *H04L 41/142* | (2022.01) | |
| *H04L 41/5051* | (2022.01) | |

(52) U.S. Cl.
CPC ...... *G06F 9/44594* (2013.01); *G06F 9/45533* (2013.01); *G06F 9/4881* (2013.01); *G06F 9/505* (2013.01); *G06F 9/544* (2013.01); *G06F 11/1004* (2013.01); *G06F 11/3433* (2013.01); *G06F 12/1408* (2013.01); *G06F 16/1865* (2019.01); *G06F 16/2322* (2019.01); *G06F 21/602* (2013.01); *H04L 9/008* (2013.01); *H04L 9/0637* (2013.01); *H04L 9/0822* (2013.01); *H04L 9/0825* (2013.01); *H04L 9/0866* (2013.01); *H04L 41/0893* (2013.01); *H04L 41/0896* (2013.01); *H04L 41/142* (2013.01); *H04L 41/145* (2013.01); *H04L 41/5009* (2013.01); *H04L 41/5025* (2013.01); *H04L 41/5051* (2013.01); *H04L 43/08* (2013.01); *H04L 47/822* (2013.01); *H04L 63/0407* (2013.01); *H04L 63/0428* (2013.01); *H04L 63/1408* (2013.01); *H04L 63/20* (2013.01); *H04L 67/1008* (2013.01); *H04L 67/12* (2013.01); *H04L 67/141* (2013.01); *G06F 2209/509* (2013.01); *G16Y 40/10* (2020.01); *H04L 67/10* (2013.01); *H04L 2209/127* (2013.01)

(58) Field of Classification Search
CPC .. G06F 21/602; G06F 2209/509; G06F 8/443; G06F 9/3836; G06F 9/44594; G06F 9/45533; G06F 9/4881; G06F 9/505; G06F 9/544; G16Y 40/10; H04L 2209/127; H04L 41/0893; H04L 41/0896; H04L 41/142; H04L 41/145; H04L 41/5009; H04L 41/5025; H04L 41/5051; H04L 43/08; H04L 47/822; H04L 63/0407; H04L 63/0428; H04L 63/1408; H04L 63/20; H04L 67/10; H04L 67/1008; H04L 67/12; H04L 67/141; H04L 9/008; H04L 9/0637; H04L 9/0822; H04L 9/0825; H04L 9/0866; H04L 9/3297

See application file for complete search history.

(56) References Cited

U.S. PATENT DOCUMENTS

| | | | |
|---|---|---|---|
| 10,827,033 B1* | 11/2020 | Balasubramanian | ... H04L 67/12 |
| 2003/0225723 A1* | 12/2003 | Agarwalla | ............ H04L 69/329 |
| 2011/0214059 A1* | 9/2011 | King | ................... H04L 43/0882 |
| | | | 715/735 |
| 2011/0296019 A1 | 12/2011 | Ferris et al. | |
| 2012/0303818 A1 | 11/2012 | Thibeault et al. | |
| 2013/0205002 A1* | 8/2013 | Wang | ..................... H04L 69/16 |
| | | | 709/224 |
| 2016/0088054 A1* | 3/2016 | Hassan | ............ H04N 21/23418 |
| | | | 709/219 |
| 2017/0019446 A1* | 1/2017 | Son | ...................... H04L 65/1063 |
| 2017/0093942 A1 | 3/2017 | Danielsson et al. | |
| 2018/0006961 A1* | 1/2018 | Guibene | ................. H04W 4/80 |
| 2018/0041958 A1 | 2/2018 | Narayanan et al. | |
| 2018/0285009 A1 | 10/2018 | Guim Bernat et al. | |
| 2018/0367637 A1 | 12/2018 | Balazinski et al. | |
| 2018/0376306 A1* | 12/2018 | Ramalho de Oliveira | .................. |
| | | | H04W 88/10 |
| 2019/0137287 A1* | 5/2019 | Pazhayampallil | ... G05D 1/0291 |
| 2019/0289610 A1* | 9/2019 | Ju | ......................... H04W 4/027 |
| 2019/0327152 A1* | 10/2019 | Shemer | ............... H04L 41/0893 |
| 2019/0334994 A1* | 10/2019 | Bower, III | .......... G06F 11/3089 |
| 2019/0373051 A1* | 12/2019 | Binotto | ................. H04L 67/306 |
| 2021/0011908 A1* | 1/2021 | Hayes | ................. G06F 16/2457 |
| 2021/0144517 A1 | 5/2021 | Guim Bernat et al. | |

FOREIGN PATENT DOCUMENTS

| | | |
|---|---|---|
| DE | 102020208023 A1 | 4/2021 |
| EP | 3535945 | 9/2019 |
| WO | 2020226979 | 11/2020 |
| WO | WO-2020226979 A2 | 11/2020 |
| WO | WO-2020226979 A8 | 11/2020 |

OTHER PUBLICATIONS

"U.S. Appl. No. 17/119,785, Preliminary Amendment filed", 7 pgs.
"International Application Serial No. PCT/US2020/030554, International Search Report dated Jan. 15, 2021", 5 pgs.
"International Application Serial No. PCT/US2020/030554, Written Opinion dated Jan. 15, 2021", 6 pgs.
Guangshun, Li, et al., "Method of Resource Estimation Based on QoS in Edge Computing, Published in: Hindawi Wireless Communications and Mobile Computing", (Jan. 22, 2018), 10 pgs.
Hesham, El-Sayed, et al., "Edge of Things: The Big Picture on the Integration of Edge, IoT and the Cloud in a Distributed Computing Environment", (Feb. 14, 2018), 12 pgs.

* cited by examiner

ADAPTIVE DATAFLOW TRANSFORMATION IN EDGE COMPUTING ENVIRONMENTS

PRIORITY APPLICATIONS

This application claims the benefit of priority to U.S. Provisional Application Ser. No. 62/907,597, filed Sep. 28, 2019 and to U.S. Provisional Application Ser. No. 62/939,303, filed Nov. 22, 2019, all of which are incorporated herein by reference in their entirety.

TECHNICAL FIELD

Embodiments described herein generally relate to data processing, network communication, and communication system implementations, and in particular, to techniques for adapting dataflow between an edge computing node and a connected device in edge computing and Internet of Things (IoT) device networks to address dynamic network conditions.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved.

In a similar manner, Internet of Things (IoT) networks and devices are designed to offer a distributed compute arrangement, from a variety of endpoints. IoT devices are physical or virtualized objects that may communicate on a network, and may include sensors, actuators, and other input/output components, which may be used to collect data or perform actions in a real-world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

The deployment of various Edge, Fog, MEC, and IoT networks, devices, and services have introduced a number of advanced use cases and scenarios occurring at and towards the edge of the network. Enterprise and cloud edge deployments may include wired or wireless connectivity. However, these advanced use cases have also introduced a number of corresponding technical challenges relating to security, processing and network resources, service availability and efficiency, among many other issues. One such challenge is in relation to security and trust, and the ability to establish trusted computing relationships and domains. As trusted computing concepts have become increasingly implemented within computing systems and deployments, the use cases for attestation, trust claims, and trust proofs has expanded, to improve operations with trusted entities (or conversely, to exclude or protect from untrusted entities).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
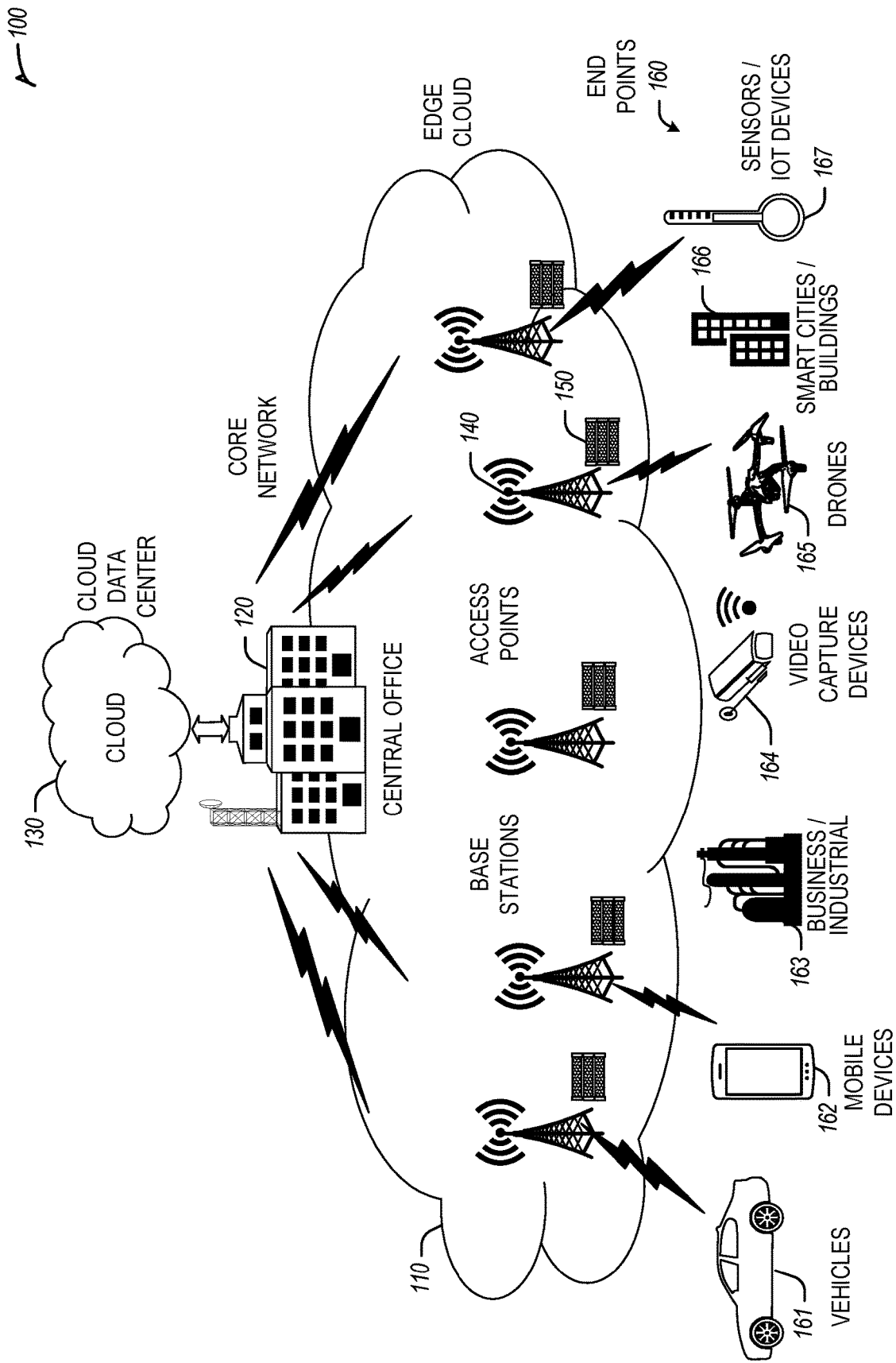
FIG. 1 illustrates an overview of an edge cloud configuration for edge computing, according to an example.

Edge computing service level agreements, performance, and user experience may correlate to a capacity of an edge computing infrastructure. The edge computing infrastructure may be leveraged to provide data plane capacity from a device or user (or Customer Premise Equipment (CPE)) directly to an edge service where data is to be processed. Given the dynamic nature of edge computing environments due to variables such as dynamic load, movement of data, movement of user, etc., providing adequate capacity may be a complex problem to address.

The systems and techniques discussed herein solve this problem by enabling cooperation between the edge infrastructure and edge connected devices (e.g., User Equipment (UE)) by facilitating a partial exchange of available information about data plane capacities and latencies at network hops (e.g., node hop, network hop, etc.) that the device may transverse in the next N units of time (e.g., Base Station (BS) 1, BS2, etc.). A base station may be a type of street cabinet providing services to devices within its communication range. The device may be provided with transformation functions that may allow the device to adapt dataflow in a variety of ways. Transformation functions may include operations that an edge connected device may use to alter a dataflow for a particular a data type. The edge connected device may maintain a table of available transformation functions that may be invoked when a metric indicates an adverse impact on the dataflow. For example, the device may prefetch more data, buffer more data, compress more (e.g., at higher computational cost), (4) reduce or improve the quality of the data (e.g., reduce resolution of images, reduce entropy of the data, etc.).

Traditional capacity management solutions may be based on static solutions that may map data sources at the beginning with the mapping rarely changing unless a connection is reset, based on intelligence residing in a centralized location (e.g., a service that provides source mapping based on intelligence that runs on the cloud), or may not utilize prediction schemes that use UE requirements, movement, and edge infrastructure to perform dataflow adaptation.

In contrast, the systems and techniques discussed herein provide coordination between the UE and edge infrastructure to adapt (e.g., vary bitrate, etc.) the dataflow to match UE device capabilities, current network connection properties, current compute demand, type of content along with user's subscription or access mode (e.g., whether it is casual free content, paid-for-content, etc.), and Service Level Agreement (SLA) and bandwidth requirements. As used herein, a Services Level Objective (SLO) may be and application objective (e.g., bit-rate per second, frames per second, etc.) and a SLO may define resources (e.g., how many, etc.) are needed to satisfy a particular service level indicator (SLI). For example, two processor cores and ten gigabit per second memory may be needed to achieve a particular bit-rate, etc.

For example, in a video streaming context, the content streaming may be high definition by default and may temporarily reduce to lower resolution. In another example, very low jitter may take priority over quality of audio or video resolution. For example, a business meeting being conducted over a secure virtual channel may allow for reduction of audio fidelity to reduce jitter because timely and reliable delivery of the voice packets may be more critical to user experience than high fidelity.

A mechanism is provided to the UE that may evaluate the acceptable dataflow transformations for the service application and may evaluate the dynamic backhaul capacity and the dynamic peer-to-peer network capacity. The evaluation may determine the rate at which content may be stored and retrieved locally (e.g., in local edge storage, versus backhauled, etc.). The UE mechanism may consider distance to the cloud backend in addition to bandwidth to cloud because the distance (e.g., number of hops, etc.) may affect latency. The UE mechanism may also evaluate locations where the UE may be connected what operating conditions may be present when the UE is connected from the locations. For example, the UE may currently be connected to a street cabinet, for example, base station (BS) 1 with ten Megabits per Second (MBS) bandwidth to a location where the service is located but in ten minutes may be connected to BS2 with an expected bandwidth of twenty MBS to the service.

The systems and techniques discussed herein provide a variety of benefits over traditional capacity management solutions including: (i) the content origin servers need not generate all variants of the content (e.g., videos of varying resolution, etc.); (ii) users with various capabilities and network conditions will receive content that is suited for their capabilities because content adaptation may be more effectively performed at the network edge; (iii) collaboration among the edge servers enhances cache hit ratio and balance processing load in the network; and (iv) user feedback and SLA and corresponding SLOs are factored into the choice of what bitrate and where transcoding is performed and pre-ordering may be performed by X seconds so that, at least f(X) amount of content may be precached and preprocessed for latency hiding. This allows the for pre-cache of varying amounts of popular content according to a level of popularity (e.g., estimated by fitting a Zipf mathematical statistics model etc.) and may use scheduled delivery when possible to further optimize UE caching.

Example Edge Computing Architectures

FIG. 1 is a block diagram 100 showing an overview of a configuration for edge computing, which includes a layer of processing referenced in many of the current examples as an "edge cloud". This network topology, which may include a number of conventional networking layers (including those not shown herein), may be extended through use of the attestation techniques and network configurations discussed herein.

As shown, the edge cloud 110 is co-located at an edge location, such as the base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer end point devices than at a base station or at a central office). However, the closer that the edge location is to the endpoint (e.g., UEs), the more that space and power is constrained. Thus, edge computing, as a general design principle, attempts to minimize the amount of resources needed for network services, through the distribution of more resources which are located closer both geographically and in network access time.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. These and other scenarios may involve the use of attestation, as provided in the discussion below.

In contrast to the network architecture of FIG. 1, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 2:
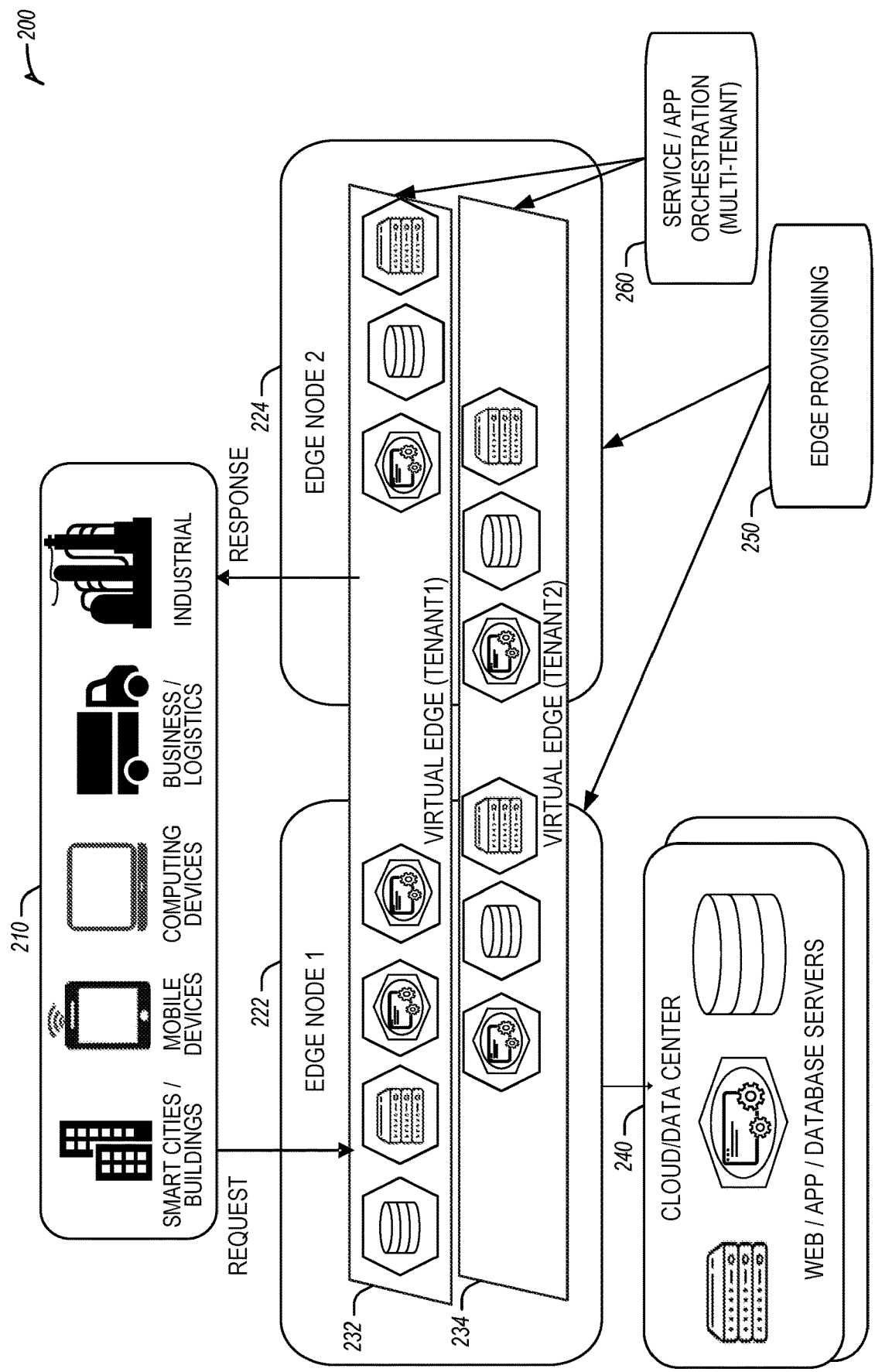
FIG. 2 illustrates deployment and orchestration for virtual edge configurations across an edge computing system operated among multiple edge nodes and multiple tenants, according to an example.

FIG. 2 illustrates deployment and orchestration for virtual edge configurations across an edge computing system operated among multiple edge nodes and multiple tenants. Specifically, FIG. 2 depicts coordination of a first edge node 222 and a second edge node 224 in an edge computing system 200, to fulfill requests and responses for various client endpoints 210 from various virtual edge instances. The virtual edge instances provide edge compute capabilities and processing in an edge cloud, with access to a cloud/data center 240 for higher-latency requests for websites, applications, database servers, etc. Thus, the edge cloud enables coordination of processing among multiple edge nodes for multiple tenants or entities.

In the example of FIG. 2, these virtual edge instances include: a first virtual edge 232, offered to a first tenant (Tenant 1), which offers a first combination of edge storage, computing, and services; and a second virtual edge 234, offering a second combination of edge storage, computing, and services, to a second tenant (Tenant 2). The virtual edge instances 232, 234 are distributed among the edge nodes 222, 224, and may include scenarios in which a request and response are fulfilled from the same or different edge nodes. The configuration of each edge node 222, 224 to operate in a distributed yet coordinated fashion occurs based on edge provisioning functions 250. The functionality of the edge nodes 222, 224 to provide coordinated operation for applications and services, among multiple tenants, occurs based on orchestration functions 260. In an example, multiple tenants may share virtual edge 232.

It should be understood that some of the devices in 210 are multi-tenant devices where Tenant 1 may function within a Tenant 1 'slice' while a Tenant2 may function within a Tenant2 slice. A trusted multi-tenant device may further contain a tenant specific cryptographic key such that the combination of key and slice may be considered a "root of trust" (RoT) or tenant-specific RoT. A RoT may further be computed dynamically composed using a security architecture, such as a DICE (Device Identity Composition Engine) architecture where a DICE hardware building block is used to construct layered trusted computing base contexts for layering of device capabilities (such as a Field Programmable Gate Array (FPGA)). The RoT also may be used for a trusted computing context to support respective tenant operations, etc. Use of this RoT and the security architecture may be enhanced by the attestation operations further discussed herein.

Edge computing nodes may partition resources (memory, CPU, GPU, interrupt controller, I/O controller, memory controller, bus controller, etc.) where each partition may contain a RoT capability and where fan-out and layering according to a DICE model may further be applied to edge nodes. Cloud computing nodes consisting of containers. FaaS (function as a service) engines, servlets, servers, or other computation abstraction may be partitioned according to a DICE layering and fan-out structure to support a RoT context for each. Accordingly, the respective RoTs spanning entities 210, 222, and 240 may coordinate the establishment of a distributed trusted computing base (DTCB) such that a tenant-specific virtual trusted secure channel linking all elements end-to-end can be established.

Additionally, the edge computing system may be extended to provide orchestration of multiple applications through the use of containers (a contained, deployable unit of software that provides code and needed dependencies), in a multi-owner, multi-tenant environment. A multi-tenant orchestrator may be used to perform key management, trust anchor management, and other security functions related to the provisioning and lifecycle of the trusted 'slice' concept in FIG. 2. An orchestrator may use a DICE layering and fan-out construction to create a root of trust context that is tenant-specific. Thus, orchestration functions, provided by an orchestrator, may participate as a tenant-specific orchestration provider.

Accordingly, an edge computing system may be configured to fulfill requests and responses for various client endpoints from multiple virtual edge instances (and, from a cloud or remote data center, not shown). The use of these virtual edge instances supports multiple tenants and multiple applications (e.g., AR/VR, enterprise applications, content delivery, gaming, compute offload) simultaneously. Further, there may be multiple types of applications within the virtual edge instances (e.g., normal applications, latency sensitive applications, latency critical applications, user plane applications, networking applications, etc.). The virtual edge instances may also be spanned across systems of multiple owners at different geographic locations.

In further examples, edge computing systems may deploy containers in an edge computing system. As a simplified example, a container manager is adapted to launch containerized pods, functions, and functions-as-a-service instances through execution via compute nodes, or to separately execute containerized virtualized network functions through execution via compute nodes. This arrangement may be adapted for use by multiple tenants in system arrangement, where containerized pods, functions, and functions-as-a-service instances are launched within virtual machines specific to each tenant (aside the execution of virtualized network functions).

Within the edge cloud, a first edge node 222 (e.g., operated by a first owner) and a second edge node 224 (e.g., operated by a second owner) may operate or respond to a container orchestrator to coordinate the execution of various applications within the virtual edge instances offered for respective tenants. For instance, the edge nodes 222, 224 may be coordinated based on edge provisioning functions 250, while the operation of the various applications are coordinated with orchestration functions 260.

Various system arrangements may provide an architecture that treats Virtual Machines, Containers, and Functions equally in terms of application composition (and resulting applications are combinations of these three ingredients). Each ingredient may involve use of one or more accelerator (e.g., FPGA, ASIC) components as a local backend. In this manner, applications can be split across multiple edge owners, coordinated by an orchestrator.

Figure 3:
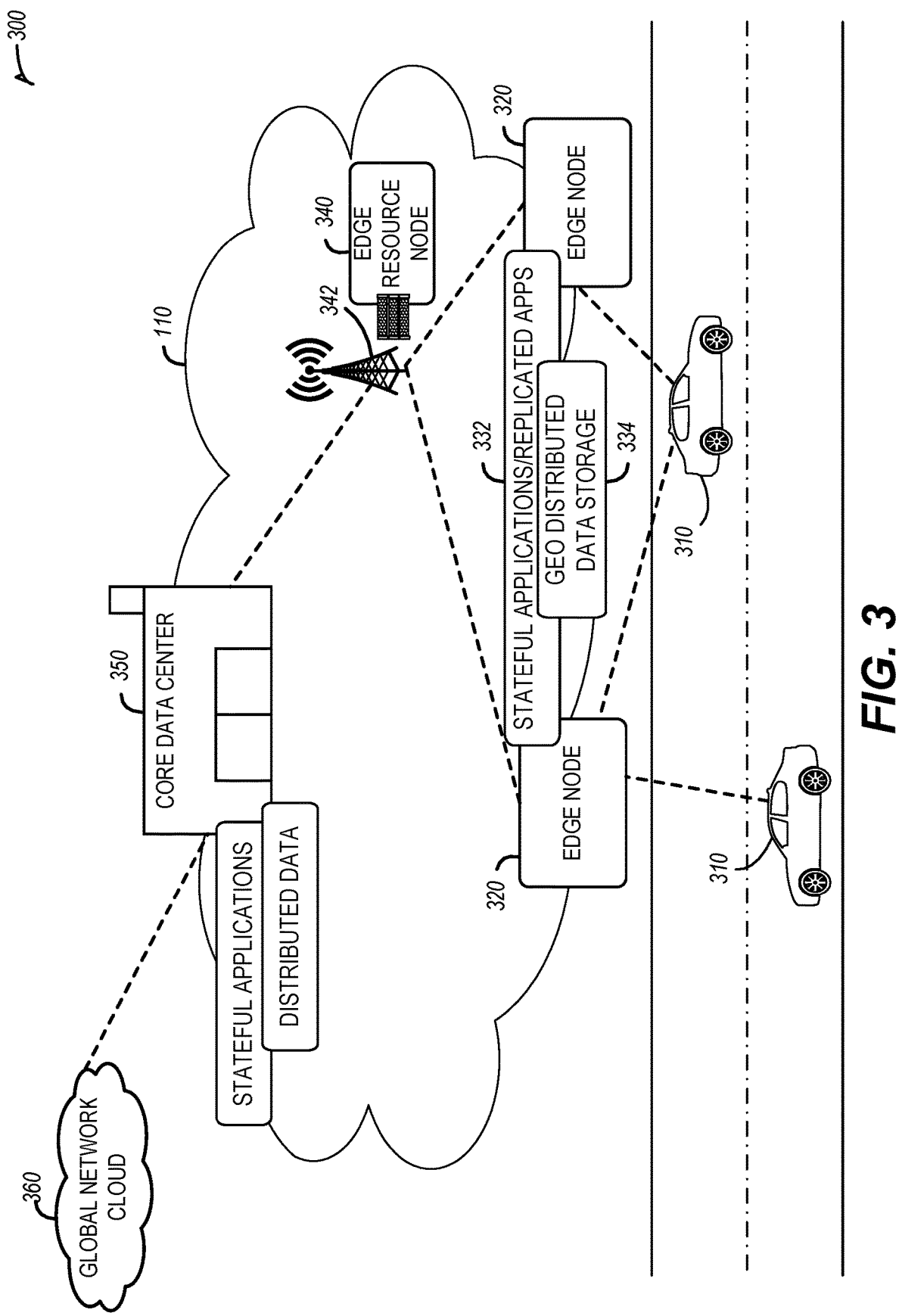
FIG. 3 illustrates a vehicle compute and communication use case involving mobile access to applications in an edge computing system, according to an example.

It should be appreciated that the edge computing systems and arrangements discussed herein may be applicable in various solutions, services, and/or use cases. As an example, FIG. 3 shows a simplified vehicle compute and communication use case involving mobile access to applications in an edge computing system 300 that implements an edge cloud 110. In this use case, each client compute node 310 may be embodied as in-vehicle compute systems (e.g., in-vehicle navigation and/or infotainment systems) located in corresponding vehicles that communicate with the edge gateway nodes 320 during traversal of a roadway. For instance, edge gateway nodes 320 may be located in roadside cabinets, which may be placed along the roadway, at intersections of the roadway, or other locations near the roadway. As each vehicle traverses along the roadway, the connection between its client compute node 310 and a particular edge gateway node 320 may propagate so as to maintain a consistent connection and context for the client compute node 310. Each of the edge gateway nodes 320 includes some processing and storage capabilities and, as such, some processing and/or storage of data for the client compute nodes 310 may be performed on one or more of the edge gateway nodes 320.

Each of the edge gateway nodes 320 may communicate with one or more edge resource nodes 340, which are illustratively embodied as compute servers, appliances or components located at or in a communication base station 342 (e.g., a base station of a cellular network). As discussed above, each edge resource node 340 includes some processing and storage capabilities and, as such, some processing and/or storage of data for the client compute nodes 310 may be performed on the edge resource node 340. For example, the processing of data that is less urgent or important may be performed by the edge resource node 340, while the processing of data that is of a higher urgency or importance may be performed by edge gateway devices or the client nodes themselves (depending on, for example, the capabilities of each component). Further, various wired or wireless communication links (e.g., fiber optic wired backhaul, 5G wireless links) may exist among the edge nodes 320, edge resource node(s) 340, core data center 350, and network cloud 360.

The edge resource node(s) 340 also communicate with the core data center 350, which may include compute servers, appliances, and/or other components located in a central location (e.g., a central office of a cellular communication network). The core data center 350 may provide a gateway to the global network cloud 360 (e.g., the Internet) for the edge cloud 110 operations formed by the edge resource node(s) 340 and the edge gateway nodes 320. Additionally, in some examples, the core data center 350 may include an amount of processing and storage capabilities and, as such, some processing and/or storage of data for the client compute devices may be performed on the core data center 350 (e.g., processing of low urgency or importance, or high complexity). The edge gateway nodes 320 or the edge resource nodes 340 may offer the use of stateful applications 332 and a geographic distributed data storage 334 (e.g., database, data store, etc.).

In further examples, FIG. 3 may utilize various types of mobile edge nodes, such as an edge node hosted in a vehicle (e.g., car, truck, tram, train, etc.) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in a variety of settings, including coordination between some functions or operations at individual endpoint devices or the edge gateway nodes 320, some others at the edge resource node 340, and others in the core data center 350 or global network cloud 360.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including a support of respective functions that support edge computing as a service. Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require deployment or configuration).

Example Computing Devices

Figure 4:
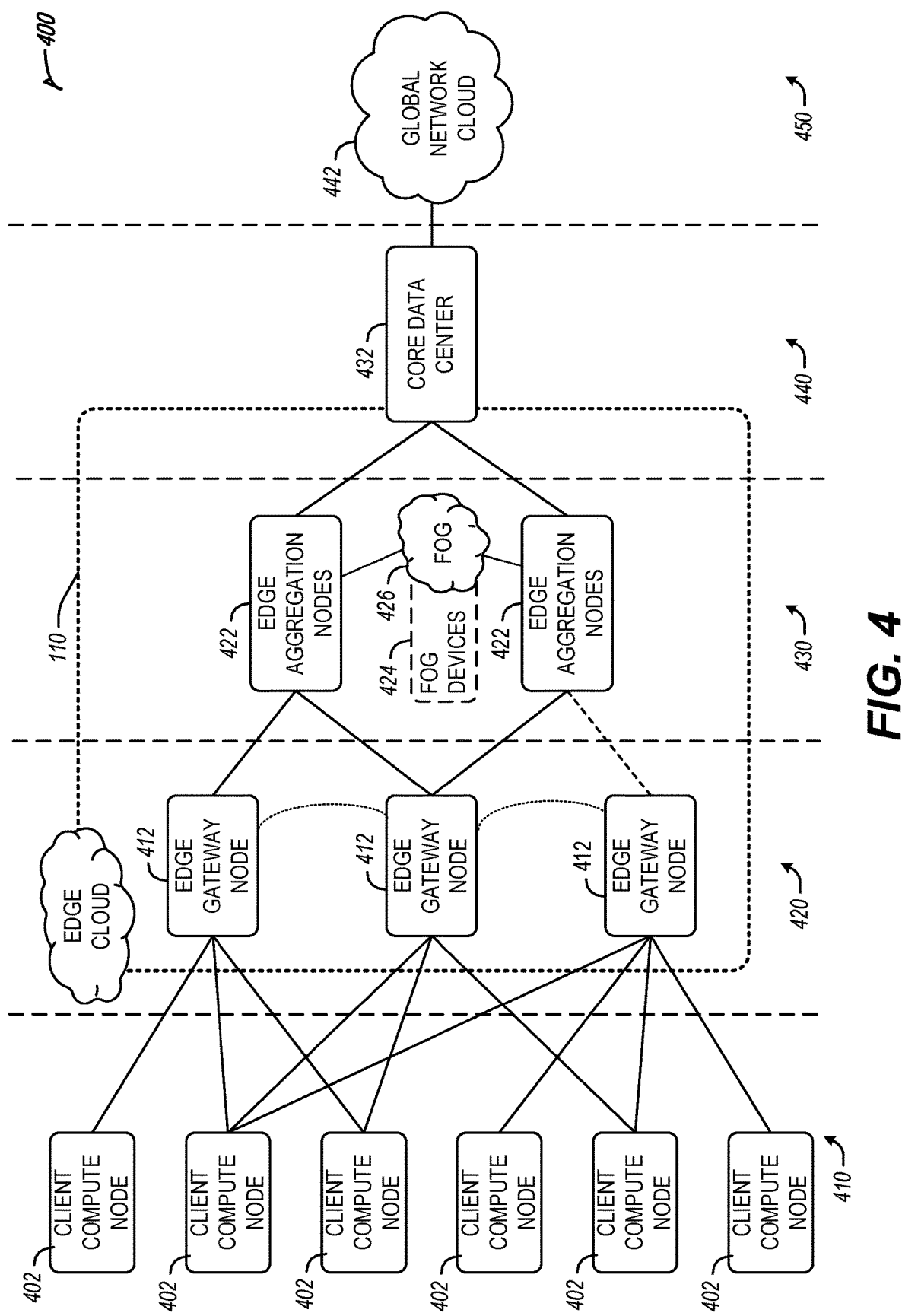
FIG. 4 illustrates an overview of layers of distributed compute deployed among an edge computing system, according to an example.

At a more generic level, an edge computing system may be described to encompass any number of deployments operating in the edge cloud 110, which provide coordination from client and distributed computing devices. FIG. 4 provides a further abstracted overview of layers of distributed compute deployed among an edge computing environment for purposes of illustration.

FIG. 4 generically depicts an edge computing system 400 for providing edge services and applications to multi-stakeholder entities, as distributed among one or more client compute nodes 402, one or more edge gateway nodes 412, one or more edge aggregation nodes 422, one or more core data centers 432, and a global network cloud 442, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities. Various forms of wired or wireless connections may be configured to establish connectivity among the nodes 402, 412, 422, 432, including interconnections among such nodes (e.g., connections among edge gateway nodes 412, and connections among edge aggregation nodes 422).

Each node or device of the edge computing system is located at a particular layer corresponding to layers 410, 420, 430, 440, 450. For example, the client compute nodes 402 are each located at an endpoint layer 410, while each of the edge gateway nodes 412 are located at an edge devices layer 420 (local level) of the edge computing system. Additionally, each of the edge aggregation nodes 422 (and/or fog devices 424, if arranged or operated with or among a fog networking configuration 426) are located at a network access layer 430 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 432 is located at a core network layer 440 (e.g., a regional or geographically-central level), while the global network cloud 442 is located at a cloud data center layer 450 (e.g., a national or global layer). The use of "core" is provided as a term for a centralized network location-deeper in the network—which is accessible by multiple edge nodes or components; however, a "core" does not necessarily designate the "center" or the deepest location of the network. Accordingly, the core data center 432 may be located within, at, or near the edge cloud 110.

Although an illustrative number of client compute nodes 402, edge gateway nodes 412, edge aggregation nodes 422, core data centers 432, global network clouds 442 are shown in FIG. 4, it should be appreciated that the edge computing system may include more or fewer devices or systems at each layer. Additionally, as shown in FIG. 4, the number of components of each layer 410, 420, 430, 440, 450 generally increases at each lower level (i.e., when moving closer to endpoints). As such, one edge gateway node 412 may service multiple client compute nodes 402, and one edge aggregation node 422 may service multiple edge gateway nodes 412.

Consistent with the examples provided herein, each client compute node 402 may be embodied as any type of end point component, device, appliance, or "thing" capable of communicating as a producer or consumer of data. Further, the label "node" or "device" as used in the edge computing system 400 does not necessarily mean that such node or device operates in a client or slave role; rather, any of the nodes or devices in the edge computing system 400 refer to individual entities, nodes, or subsystems which include discrete or connected hardware or software configurations to facilitate or use the edge cloud 110.

As such, the edge cloud 110 is formed from network components and functional features operated by and within the edge gateway nodes 412 and the edge aggregation nodes 422 of layers 420, 430, respectively. The edge cloud 110 may be embodied as any type of network that provides edge computing and/or storage resources which are proximately located to radio access network (RAN) capable endpoint devices (e.g., mobile computing devices, IoT devices, smart devices, etc.), which are shown in FIG. 4 as the client compute nodes 402. In other words, the edge cloud 110 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-FI, long-range wireless networks) may also be utilized in place of or in combination with such 3GPP carrier networks.

In some examples, the edge cloud 110 may form a portion of or otherwise provide an ingress point into or across a fog networking configuration 426 (e.g., a network of fog devices 424, not shown in detail), which may be embodied as a system-level horizontal and distributed architecture that distributes resources and services to perform a specific function. For instance, a coordinated and distributed network of fog devices 424 may perform computing, storage, control, or networking aspects in the context of an IoT system arrangement. Other networked, aggregated, and distributed functions may exist in the edge cloud 110 between the cloud data center layer 450 and the client endpoints (e.g., client compute nodes 402). Some of these are discussed in the following sections in the context of network functions or service virtualization, including the use of virtual edges and virtual services which are orchestrated for multiple stakeholders.

The edge gateway nodes 412 and the edge aggregation nodes 422 cooperate to provide various edge services and security to the client compute nodes 402. Furthermore, because each client compute node 402 may be stationary or mobile, each edge gateway node 412 may cooperate with other edge gateway devices to propagate presently provided edge services and security as the corresponding client compute node 402 moves about a region. To do so, each of the edge gateway nodes 412 and/or edge aggregation nodes 422 may support multiple tenancy and multiple stakeholder configurations, in which services from (or hosted for) multiple service providers and multiple consumers may be supported and coordinated across a single or multiple compute devices.

In various examples, the present attestation techniques may be implemented among the client compute nodes 402 (e.g., at a client who receives an attestation token), at the edge gateway nodes 412 or aggregation nodes 422 (e.g., at a resource node which has a resource to be attested), and other intermediate nodes in the edge cloud 110 (e.g., which operate orchestrator functions, attestation service functions, etc.), as further discussed below with reference to FIGS. 8 and 9.

In further examples, any of the compute nodes or devices discussed with reference to the present edge computing systems and environment may be fulfilled based on the components depicted in FIGS. 5A and 5B. Each edge compute node may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

Figure 5A:
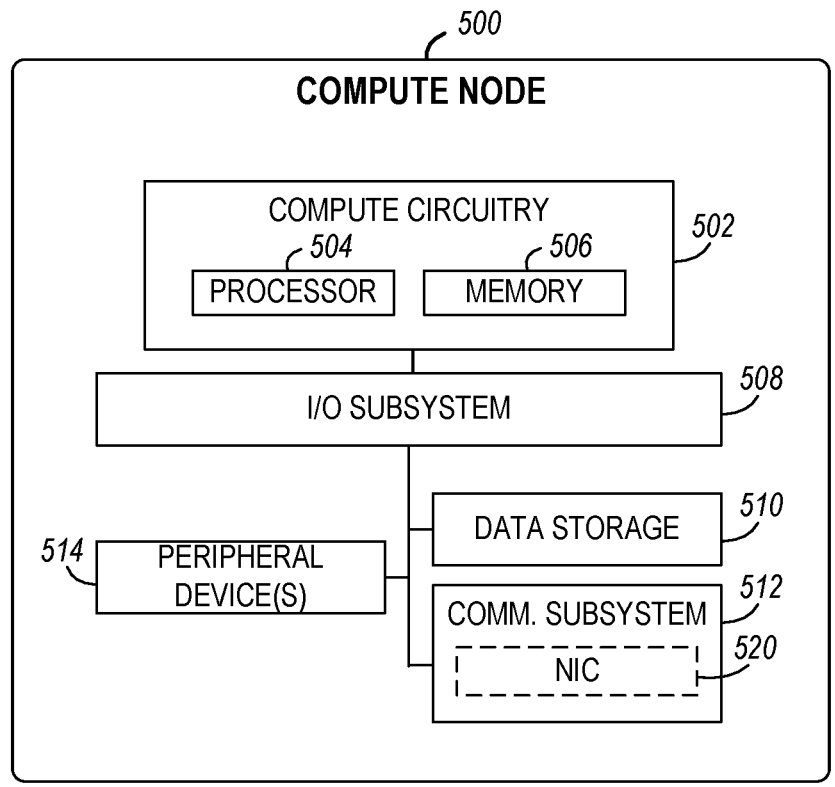
FIG. 5A illustrates an overview of example components deployed at a compute node system, according to an example.

In the simplified example depicted in FIG. 5A, an edge compute node 500 includes a compute engine (also referred to herein as "compute circuitry") 502, an input/output (I/O) subsystem 508, data storage 510, a communication circuitry subsystem 512, and, optionally, one or more peripheral devices 514. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 500 may be embodied as any type of engine, device, or collection of devices capable of performing various compute functions. In some examples, the compute node 500 may be embodied as a single device such as an integrated circuit, an embedded system, a field-programmable gate array (FPGA), a system-on-a-chip (SOC), or other integrated system or device. In the illustrative example, the compute node 500 includes or is embodied as a processor 504 and a memory 506. The processor 504 may be embodied as any type of processor capable of performing the functions described herein (e.g., executing an application). For example, the processor 504 may be embodied as a multi-core processor(s), a microcontroller, or other processor or processing/controlling circuit. In some examples, the processor 504 may be embodied as, include, or be coupled to an FPGA, an application specific integrated circuit (ASIC), reconfigurable hardware or hardware circuitry, or other specialized hardware to facilitate performance of the functions described herein.

The main memory 506 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 506 may be integrated into the processor 504. The main memory 506 may store various software and data used during operation such as one or more applications, data operated on by the application(s), libraries, and drivers.

The compute circuitry 502 is communicatively coupled to other components of the compute node 500 via the I/O subsystem 508, which may be embodied as circuitry and/or components to facilitate input/output operations with the compute circuitry 502 (e.g., with the processor 504 and/or the main memory 506) and other components of the compute circuitry 502. For example, the I/O subsystem 508 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 508 may form a portion of a system-on-a-chip (SoC) and be incorporated, along with one or more of the processor 504, the main memory 506, and other components of the compute circuitry 502, into the compute circuitry 502.

The one or more illustrative data storage devices 510 may be embodied as any type of devices configured for short-term or long-term storage of data such as, for example, memory devices and circuits, memory cards, hard disk drives, solid-state drives, or other data storage devices. Each data storage device 510 may include a system partition that stores data and firmware code for the data storage device 510. Each data storage device 510 may also include one or more operating system partitions that store data files and executables for operating systems depending on, for example, the type of compute node 500.

The communication circuitry 512 may be embodied as any communication circuit, device, or collection thereof, capable of enabling communications over a network between the compute circuitry 502 and another compute device (e.g., an edge gateway node 412 of the edge computing system 400). The communication circuitry 512 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol. Ethernet, Bluetooth®, etc.) to effect such communication.

The illustrative communication circuitry 512 includes a network interface controller (NIC) 520, which may also be referred to as a host fabric interface (HFI). The NIC 520 may be embodied as one or more add-in-boards, daughter cards, network interface cards, controller chips, chipsets, or other devices that may be used by the compute node 500 to connect with another compute device (e.g., an edge gateway node 412). In some examples, the NIC 520 may be embodied as part of a system-on-a-chip (SoC) that includes one or more processors, or included on a multichip package that also contains one or more processors. In some examples, the NIC 520 may include a local processor (not shown) and/or a local memory (not shown) that are both local to the NIC 520. In such examples, the local processor of the NIC 520 may be capable of performing one or more of the functions of the compute circuitry 502 described herein. Additionally or alternatively, in such examples, the local memory of the NIC 520 may be integrated into one or more components of the client compute node at the board level socket level, chip level, and/or other levels.

Additionally, in some examples, each compute node 500 may include one or more peripheral devices 514. Such peripheral devices 514 may include any type of peripheral device found in a compute device or server such as audio input devices, a display, other input/output devices, interface devices, and/or other peripheral devices, depending on the particular type of the compute node 500. In further examples, the compute node 500 may be embodied by a respective edge compute node in an edge computing system (e.g., client compute node 402, edge gateway node 412, edge aggregation node 422) or like forms of appliances, computers, subsystems, circuitry, or other components.

Figure 5B:
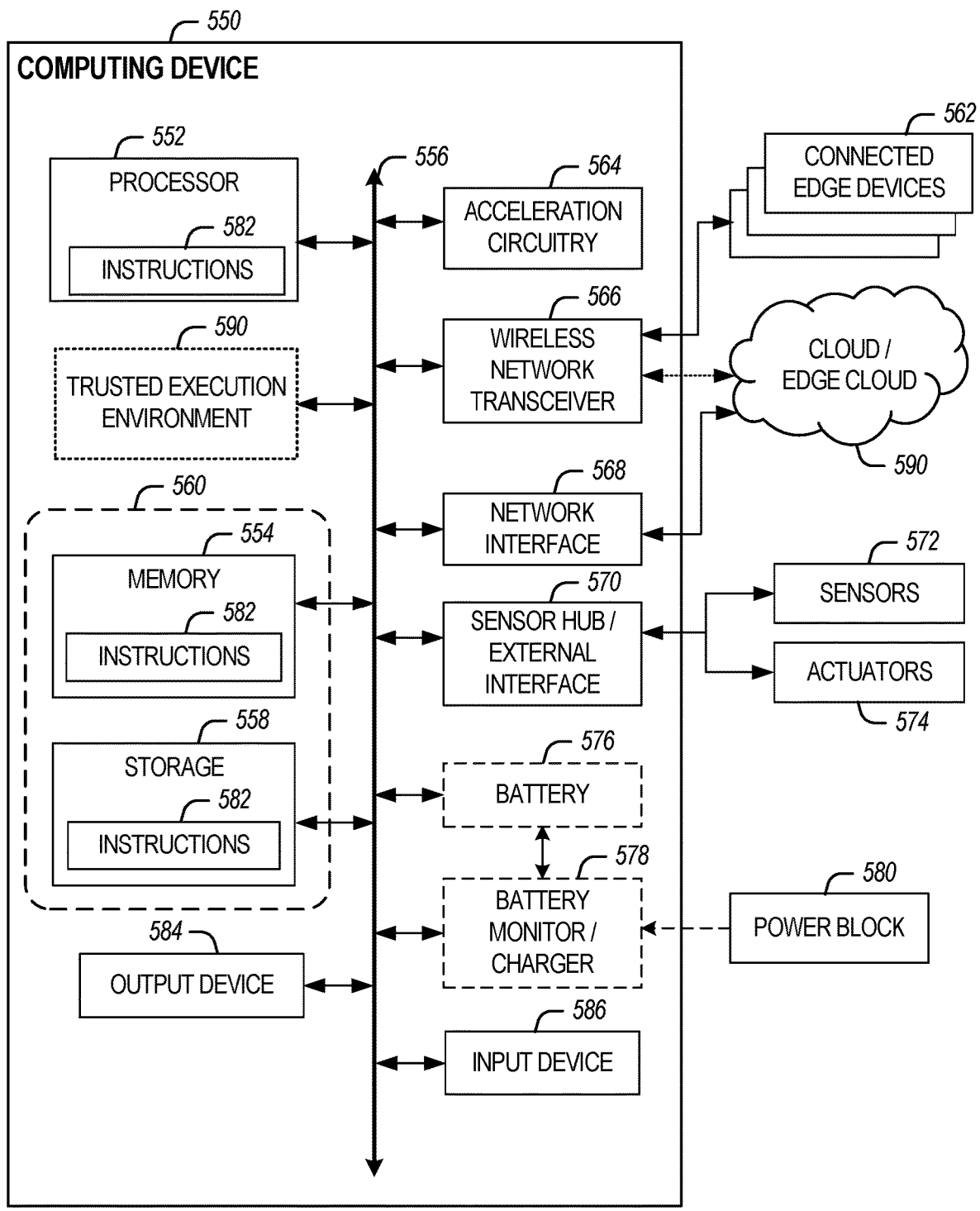
FIG. 5B illustrates a further overview of example components within a computing device, according to an example.

In a more detailed example, FIG. 5B illustrates a block diagram of an example of components that may be present in an edge computing node 550 for implementing the techniques (e.g., operations, processes, methods, and methodologies) described herein. The edge computing node 550 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 550, or as components otherwise incorporated within a chassis of a larger system.

The edge computing node 550 may include processing circuitry in the form of a processor 552, which may be a microprocessor, a multi-core processor, a multithreaded processor, an ultra-low voltage processor, an embedded processor, or other known processing elements. The processor 552 may be a part of a system on a chip (SoC) in which the processor 552 and other components are formed into a single integrated circuit, or a single package, such as the Edison™ or Galileo™ SoC boards from Intel Corporation, Santa Clara, Calif. As an example, the processor 552 may include an Intel® Architecture Core™ based processor, such as a Quark™, an Atomm™, an i3, an i5, an i7, an i9, or an MCU-class processor, or another such processor available from Intel®. However, any number other processors may be used, such as available from Advanced Micro Devices. Inc. (AMD) of Sunnyvale, Calif., a MIPS-based design from MIPS Technologies, Inc. of Sunnyvale, Calif., an ARM-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 552 may communicate with a system memory 554 over an interconnect 556 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2. LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR). JESD209-2 for LPDDR2. JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 558 may also couple to the processor 552 via the interconnect 556. In an example, the storage 558 may be implemented via a solid-state disk drive (SSDD). Other devices that may be used for the storage 558 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magneto-resistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 558 may be on-die memory or registers associated with the processor 552. However, in some examples, the storage 558 may be implemented using a micro hard disk drive (HDD). Further, any number of new technologies may be used for the storage 558 in addition to, or instead of, the technologies described, such resistance change memories, phase change memories, holographic memories, or chemical memories, among others.

The components may communicate over the interconnect 556. The interconnect 556 may include any number of technologies, including industry standard architecture (ISA), extended ISA (EISA), peripheral component interconnect (PCI), peripheral component interconnect extended (PCIx), PCI express (PCIe), or any number of other technologies. The interconnect 556 may be a proprietary bus, for example, used in an SoC based system. Other bus systems may be included, such as an I2C interface, an SPI interface, point to point interfaces, and a power bus, among others.

The interconnect 556 may couple the processor 552 to a transceiver 566, for communications with the connected edge devices 562. The transceiver 566 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 562. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 566 (or multiple transceivers) may communicate using multiple standards or radios for communications at a different range. For example, the edge computing node 550 may communicate with close devices, e.g., within about 10 meters, using a local transceiver based on BLE, or another low power radio, to save power. More distant connected edge devices 562, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 566 (e.g., a radio transceiver) may be included to communicate with devices or services in the edge cloud 590 via local or wide area network protocols. The wireless network transceiver 566 may be an LPWA transceiver that follows the IEEE 802.15.4, or IEEE 802.15.4g standards, among others. The edge computing node 550 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 566, as described herein. For example, the transceiver 566 may include a cellular transceiver that uses spread spectrum (SPA/SAS) communications for implementing high-speed communications. Further, any number of other protocols may be used, such as Wi-Fi® networks for medium speed communications and provision of network communications. The transceiver 566 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 568 may be included to provide a wired communication to nodes of the edge cloud 590 or to other devices, such as the connected edge devices 562 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 568 may be included to enable connecting to a second network, for example, a first NIC 568 providing communications to the cloud over Ethernet, and a second NIC 568 providing communications to other devices over another type of network.

Given the variety of types of applicable communications from the device to another component or network, applicable communications circuitry used by the device may include or be embodied by any one or more of components 564, 566, 568, or 570. Accordingly, in various examples, applicable means for communicating (e.g., receiving, transmitting, etc.) may be embodied by such communications circuitry.

The edge computing node 550 may include or be coupled to acceleration circuitry 564, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 556 may couple the processor 552 to a sensor hub or external interface 570 that is used to connect additional devices or subsystems. The devices may include sensors 572, such as accelerometers, level sensors, flow sensors, optical light sensors, camera sensors, temperature sensors, a global positioning system (GPS) sensors, pressure sensors, barometric pressure sensors, and the like. The hub or interface 570 further may be used to connect the edge computing node 550 to actuators 574, such as power switches, valve actuators, an audible sound generator, a visual warning device, and the like.

In some optional examples, various input/output (I/O) devices may be present within or connected to, the edge computing node 550. For example, a display or other output device 584 may be included to show information, such as sensor readings or actuator position. An input device 586, such as a touch screen or keypad may be included to accept input. An output device 584 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 550.

A battery 576 may power the edge computing node 550, although, in examples in which the edge computing node 550 is mounted in a fixed location, it may have a power supply coupled to an electrical grid. The battery 576 may be a lithium ion battery, or a metal-air battery, such as a zinc-air battery, an aluminum-air battery, a lithium-air battery, and the like.

A battery monitor/charger 578 may be included in the edge computing node 550 to track the state of charge (SoCh) of the battery 576. The battery monitor/charger 578 may be used to monitor other parameters of the battery 576 to provide failure predictions, such as the state of health (SoH) and the state of function (SoF) of the battery 576. The battery monitor/charger 578 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 578 may communicate the information on the battery 576 to the processor 552 over the interconnect 556. The battery monitor/charger 578 may also include an analog-to-digital (ADC) converter that enables the processor 552 to directly monitor the voltage of the battery 576 or the current flow from the battery 576. The battery parameters may be used to determine actions that the edge computing node 550 may perform, such as transmission frequency, mesh network operation, sensing frequency, and the like.

A power block 580, or other power supply coupled to a grid, may be coupled with the battery monitor/charger 578 to charge the battery 576. In some examples, the power block 580 may be replaced with a wireless power receiver to obtain the power wirelessly, for example, through a loop antenna in the edge computing node 550. A wireless battery charging circuit, such as an LTC4020 chip from Linear Technologies of Milpitas, Calif., among others, may be included in the battery monitor/charger 578. The specific charging circuits may be selected based on the size of the battery 576, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 558 may include instructions 582 in the form of software, firmware, or hardware commands to implement the techniques described herein. Although such instructions 582 are shown as code blocks included in the memory 554 and the storage 558, it may be understood that any of the code blocks may be replaced with hardwired circuits, for example, built into an application specific integrated circuit (ASIC). Accordingly, in various examples, applicable means for storage may be embodied by such storage circuitry.

In an example, the instructions 582 provided via the memory 554, the storage 558, or the processor 552 may be embodied as a non-transitory, machine-readable medium 560 including code to direct the processor 552 to perform electronic operations in the edge computing node 550. The processor 552 may access the non-transitory, machine-readable medium 560 over the interconnect 556. Accordingly, in various examples, applicable means for processing may be embodied by such processor circuitry. For instance, the non-transitory, machine-readable medium 560 may be embodied by devices described for the storage 558 or may include specific storage units such as optical disks, flash drives, or any number of other hardware devices. The non-transitory, machine-readable medium 560 may include instructions to direct the processor 552 to perform a specific sequence or flow of actions, for example, as described with respect to the flowchart(s) and block diagram(s) of operations and functionality depicted above. As used in, the terms "machine-readable medium" and "computer-readable medium" are interchangeable. Accordingly, in various examples, applicable means for memory may be embodied by such memory circuitry.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 5A and 5B are intended to depict a high-level view of components of a device, subsystem, or arrangement of an edge computing node. However, it will be understood that some of the components shown may be omitted, additional components may be present, and a different arrangement of the components shown may occur in other implementations.

Figure 6:
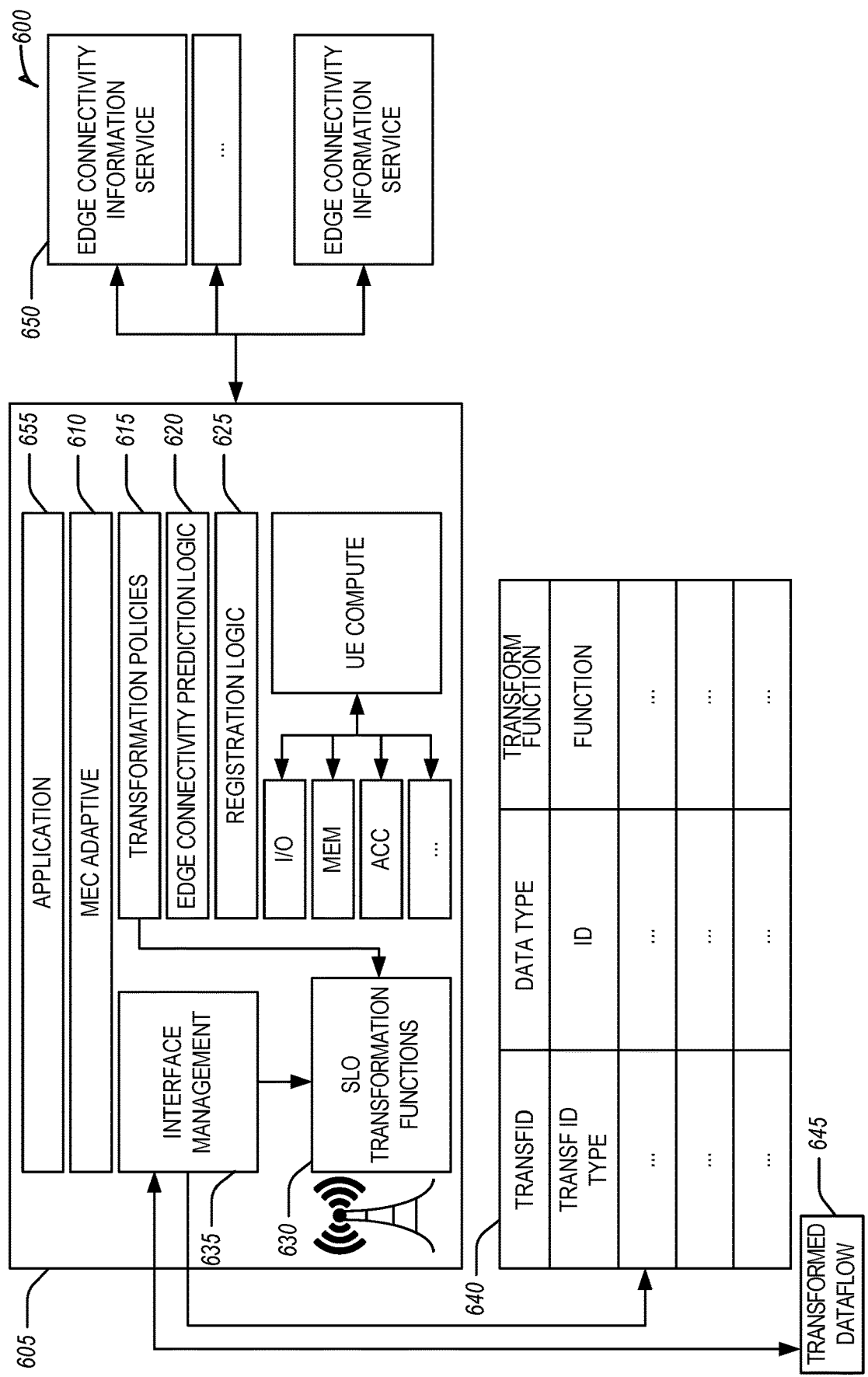
FIG. 6 illustrates an overview of an architecture for adaptive dataflow transformation in edge computing environments, according to an example.

FIG. 6 illustrates an overview of an architecture 600 for adaptive dataflow transformation in edge computing environments, according to an example. The architecture 600 may include a device 605 (e.g., UE) that is connected to an edge computing environment. The architecture 600 includes an edge connectivity information service 650 logical element that provides information to the device 605 regarding current status of various routes to a particular service (e.g., delivered via an application 655 via an edge network adaptive layer 610). The device 605 may register with the edge computing environment using registration logic 625 to receive network properties (e.g., bandwidth connectivity, latency, etc.) from one or more edge connectivity information services 650 with information about edge access to the service. The edge connectivity information service 650 (or another location-based service) may track where the service is located in the edge computing environment (e.g., the service may be moved to different locations over time, etc.) and may send updates to the devices such as device 605 so that the device 605 has connectivity information for the service. The network properties may be provided from one or more access points where the device 605 may connect during N units of time. For example, mobile device in a vehicle may have a trajectory based on movement of the device or vehicle that indicates access points that may be contacted at various time intervals.

The device 605 includes edge connectivity prediction logic 620 that allows the device 605 to determine how to send to and receive data from a particular service over time depending on the information provided by the edge connectivity information service 650. The edge connectivity prediction logic 620 may include a prediction scheme (e.g., based on Long Short-Term Memory (LSTM) neural networks, trained artificial intelligence models, etc.) that may be used to predict how network will evolve over time based on the information provided. The device 605 includes a edge network adaptive layer 610, which may be implemented using either software, or custom hardware, or a combination of software and custom hardware modules. The edge network adaptive layer 610 may provide an application programming interface (API) to the application 655, using which, the application may ask for and receive information from the edge connectivity service 650 about connectivity information along a plurality of locations. The device 605 or application 655 may utilize the connectivity information at a plurality of routes to identify a better route for receiving data plane services. It may also utilize the connectivity information at a plurality of routes to select an appropriate dataflow transformation for a particular location or route.

The device 605 may be provided with transformation policies 615 that may indicate when to invoke transformation functions 630. The transformation functions may be executed by the device 605 and may effectuate a variety of transformations to the dataflow. For example, a type of data (e.g., video, raw sensor data, text, etc.) may be provided and a transformation function may be provided that may transform that data into another format that has a different resolution or less rich data, but that allows the device 605 to send or receive more data, or, send or receive data more expediently, through a current route, or at a current location, to the service. An interface management component 635 may reference a table of transformations 640 that include various transformation functions that may be utilized to generate transformed dataflow 645. The interface management component 635 may register the transformation functions 630 and may provide a edge network API interacting with the edge network adaptive layer 610 that allows the application 655 to provide hints for the data being sent to an edge computing node and utilize the transformation functions 630 to make adaptations to the dataflow.

In an example, roots of trust (RoT) such as device identifier composition engine (DICE) may be used to secure communications between the device 605 and the edge cloud 110. Furthermore, attestation may be used in RoT to communicate to a verifier that it is interacting with a trustworthy edge node (e.g., and edge node providing the edge connectivity information service 650, etc.)—as a pre-condition to performing a number of operations on the network including data transformation.

The transformation functions 630 may perform a variety of functions. Transformation functions 630 may, for example, cause the device 605 to send more data because it is expected that the device will experience poor bandwidth at the next hop, send more data to adapt to current bandwidth to the service when the device 605 connects to a next hop with increased bandwidth, other examples of transformation functions 630 may include but are not limited to: in a Content Delivery Network (CDN), reduce the quality of an image being requested and start buffering more data to mitigate low connectivity for the next hop; in video analytics, reduce the quality of the image in order to maintain a frames per second rate required; in sensor data, reduce the number of samples being sent or increase the buffering of samples to be sent on a predicted hop with better connectivity.

A transformation function, given the SLO of the application, the type of data, and the predictions provided by the application may cause a variety of individual or combined adaptive transformations to the dataflow. These transformations include changing resolution or quality of data sent/received, increasing throughput at current time with or without changes to resolution or quality of data, buffering data temporarily, and flushing data from a local buffer at a next hop if or when connectivity improves.

Figure 7:
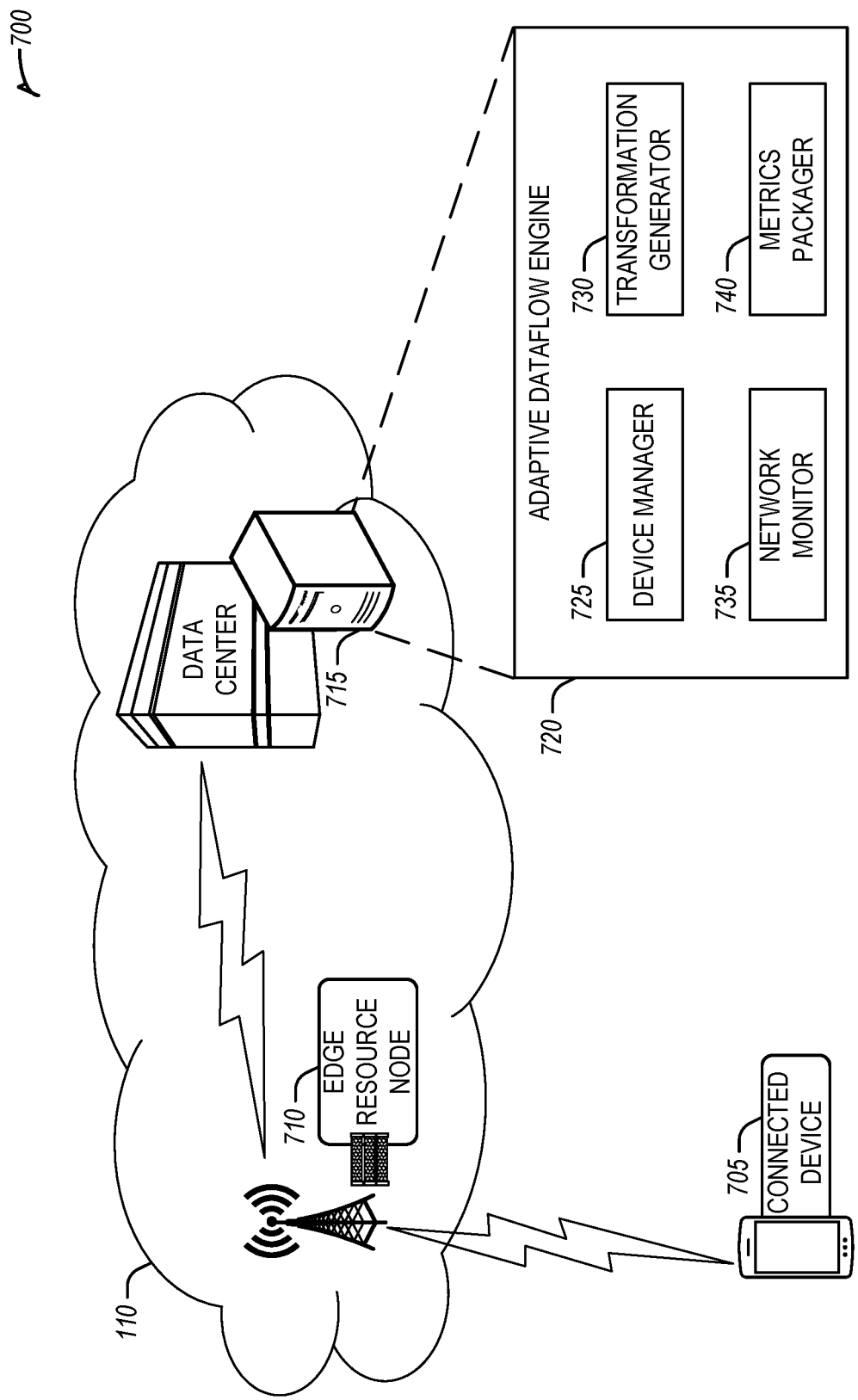
FIG. 7 is a block diagram of an environment and a system for adaptive dataflow transformation in edge computing environments, according to an example.

FIG. 7 is a block diagram of an environment 700 and a system 720 for adaptive dataflow transformation in edge computing environments, according to an example. The system 720 may provide features as described in FIG. 6. The environment may include an edge cloud 110 (e.g., as described in FIG. 1, etc.) that includes a device 705 (e.g., endpoint data sources 160 as described in FIG. 1, various client endpoints 210 as described in FIG. 2, client compute node 310 as described in FIG. 3, client compute nodes 402 as described in FIG. 4, connected edge devices 562 as described in FIG. 5B, etc.) and an edge computing node 710 associated with a base station (e.g., base station 140 as described in FIG. 1, first edge node 222 or second edge node 224 as described in FIG. 2, communication base station 342 as described in FIG. 3, one or more edge gateway nodes 412 as described in FIG. 4, edge computing node 550 as described in FIG. 5B, etc.). In an example, entities of the network may operate according to a Multi-access Edge Computing (MEC) standard provided according to a European Telecommunications Standards Institute (ETSI) standard. A server 715 (e.g., a standalone server, a cloud service, a containerized service, etc.) may be operating in a datacenter or elsewhere in the edge cloud 110. The server 715 may execute the system 720. For example, the server 715 may be executing on the edge computing node 710. In an example, the system 720 may be an adaptive flow engine. The system 720 may include a variety of components including a device manager 725, a transformation generator 730, a network monitor 735, and a metrics packager 740.

The transformation generator 730 may generate a set of transformations for services and associated edge nodes operating in the edge cloud 110. In an example, the set of transformations may include one or more of: a bit rate transformation, a data collection transformation, a data granularity transformation, a transmission timing transformation, a buffering transformation, a compression transformation, or a prefetch transformation. The transformations may be derived by analyzing workloads and dataflows associated with a service to determine how variations in aspects of the dataflow processing impact service delivery. For example, network utilization history for a node providing an audio-conferencing service may be evaluated using machine learning to identify that reducing the bit rate of an audio stream may reduce jitter leading to a higher quality of service. A transformation may then be generated to lower bit rate for an example audio-conferencing service when jitter is predicted to occur on the network.

The device manager 725 may interact with the device 705. For example, the device manager 725 may send and receive data between the system 720 and the device 705. The device manager may receive a transformation compatibility indication from the device 705. In an example, the device 705 may be registered with a registration service of an edge computing system of the edge cloud 110 to allow the device to utilize a service available in the edge cloud 110. In an example, the transformation compatibility indicator may be received during registration. The compatibility indicator may include information about the device including but not limited to hardware specifications, software information, mechanisms available for making dataflow transformations, etc. For example, the indicator may include an identification of transcoding accelerator or processor modes available in the device 705. The device manager 725 may transmit a set of transformations to the device 705. In an example, the set of transformations may be created based on the transformation compatibility indication. For example, a transformation including a function to offload video transcoding from the edge computing node 710 to the device 705 may be included in the set of transformations transmitted to the device 705 if the indicator indicates the device 705 includes a transcoding accelerator. In an example, the device manager 725 may transmit an Application Programming Interface (API) to the device 705. The API may be used by the device 705 to retrieve data and execute the transformation.

The network monitor 735 may collect metrics for dataflows and workloads occurring throughout the edge cloud 110. The network monitor 735 may determine a value for an operating metric for the edge computing node 710 of the network. The edge computing node 710 may provide a service to the device 705 via the network. In an example, the operating metric includes one or more of: a latency metric, a distance metric, a network congestion metric, or a bandwidth metric. In an example, the operating metric is a measure of operating performance between the edge computing node 710 and the device 705. For example, the network monitor 735 may track bandwidth available between the device 705 and the edge computing node 710 for an audio-conferencing session.

The network monitor 735 may include a machine learning processor that may be used to evaluate network operating metrics to predict operating metrics for portions of the network. In an example, a network model may be trained for edge computing nodes of the network using a set of training operating metrics collected from the edge computing nodes. The service and the edge computing node 710 may be evaluated using the network model to establish the operating metric. For example, the current operating metrics for the edge computing node 710 and metrics for the audio-conferencing service may be fed as input into the network model to determine a bandwidth metric for the edge computing node 710 when the audio-conferencing dataflow is added to the workload of the edge computing node 710.

The metrics packager 740 may aggregate a set of metrics into a set of edge connectivity information that may be delivered to the device 705 via the device manager 725 using an edge connectivity information service. The device manager 725 may transmit a transformation request to the device manager 725 based on the value of the operating metric. In an example, the metrics may be transmitted to the device 705 and the device 705 may select a transform to apply based on the capabilities of the device 705 and the metric value. The transformation request may cause the device 705 to execute a transformation of the set of transformation to transform a dataflow of the service. For example, the device may receive a metric that indicates network bandwidth is decreasing and the device 705 may apply a transform function to lower the bit rate of an audio-conferencing dataflow occurring between the device 705 and the edge computing node 710. In an example, the transformation may instruct the device 705 to process at least a portion of a workload associated with the service. For example, the transformation may offload video transcription from the edge computing node 710 to the device 705. In an example, the device 705 may utilize the API to obtain metrics.

In an example, a future value may be predicted for the operating metric for a forward edge computing node predicted to provide the service to the device 705 for a future time period. For example, the service may move from the edge computing node 710 to another predicted forward edge computing node in the network and a bandwidth metric may be predicted for delivery of the audio-conferencing dataflow between the device 705 and the other edge computing node. A transformation may be selected from the set of transformations based on the future value. In an example, the transformation request may include instructions for executing the selected transformation while the service is being delivered by the forward edge computing node. In an example, the device 705 may be in motion and may move from a base station that is providing access to the edge computing node 710 to a base station further along the path of motion that may provide access to another edge computing node that may be able to accept handoff of the audio-conferencing dataflow and the device 705 may adapt the dataflow by reducing the bit rate based on reduced bandwidth available at the other edge computing node. In an example, the transformation of the dataflow may be made preemptively while the device 705 is still connected to the edge computing node 710 to reduce interruption of service quality during handoff.

In an example, it may be determined that execution of a workload associated with the service has moved from the edge computing node 710 to a second edge computing node. A second value for an operating metric may be determined for the second edge computing node. A secondary transformation request may be transmitted to the device 705 based on the second value. The transformation request may cause the device 705 to execute a transformation of the set of transformations to transform the dataflow of the service by the second edge computing node.

In an example, an SLO corresponding to an SLA may be determined for the dataflow of the service to the device 705 and the SLO may be compared to the operating metric. The transformation request may be transmitted at least in part based on a result of the comparison. In another example, a second value may be determined for a second operating metric for the edge computing node 710 and the first value and the second value may be compared to a service delivery performance matrix for the service. The transformation is selected from the set of transformations based on a result of the comparison and the transformation may cause the device to perform an adaption related to the second operating metric.

Figure 8:
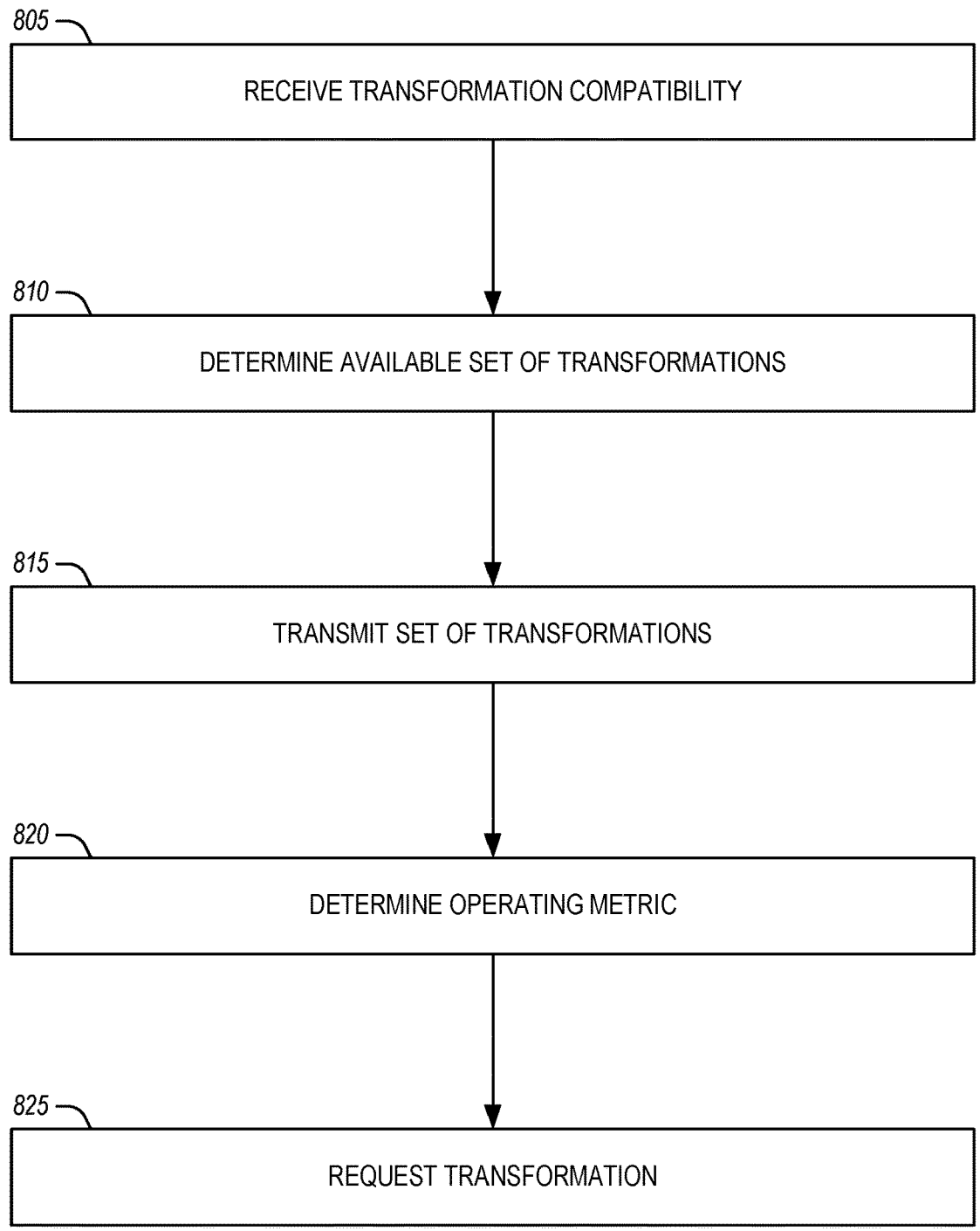
FIG. 8 illustrates a flow diagram of a method for adaptive dataflow transformation in edge computing environments, according to an example.

FIG. 8 illustrates a flow diagram of a method 800 for, according to an example. The method 800 may provide features as described in FIGS. 6 and 7.

A transformation compatibility indication may be received (e.g., by the device manager 725 as described in FIG. 7, etc.) from a device (e.g., at operation 805). In an example, the device may be registered with a registration service of the edge computing system to allow the device to utilize the service and the transformation compatibility indicator may be received during registration.

A set of transformations available for use by the device connected to the network may be determined (e.g., by the device manager 725 as generated by the transformation generator 730 as described in FIG. 7, etc.) based on the transformation compatibility indicator (e.g., at operation 810). In an example, the set of transformations may include one or more of: a bit rate transformation, a data collection transformation, a data granularity transformation, a transmission timing transformation, a buffering transformation, a compression transformation, or a prefetch transformation. In an example, the transformation may instruct the device to process at least a portion of a workload associated with the service. The set of transformations may be transmitted (e.g., by the device manager 725 as described in FIG. 7, etc.) to the device (e.g., at operation 815). In an example, entities of the network may operate according to a Multi-access Edge Computing (MEC) standard provided according to a European Telecommunications Standards Institute (ETSI) standard.

A value may be determined (e.g., by the network monitor 735 as described in FIG. 7, etc.) for an operating metric for an edge computing node of the network (e.g., at operation 820). The edge computing node may provide a service to the device via the network. In an example, the operating metric may be a measure of operating performance between the edge computing node and the device. In an example, the operating metric may include one or more of: a latency metric, a distance metric, a network congestion metric, or a bandwidth metric. In an example, a network model may be trained for edge computing nodes of the network using a set of training operating metrics collected from the edge computing nodes and the service and the edge computing node may be evaluated using the network model to establish the operating metric.

A transformation request may be transmitted (e.g., by the device manager 725 as described in FIG. 7, etc.) to the device based on the value (e.g., at operation 825). The transformation request may cause the device to execute a transformation of the set of transformations to transform a dataflow of the service. In an example, a future value may be predicted for the operating metric for a forward edge computing node predicted to provide the service to the device for a future time period and a transformation may be selected from the set of transformations based on the future value. The transformation request may include instructions for executing the selected transformation while the service is being delivered by the forward edge computing node. In an example, an Application Programming Interface (API) may be transmitted to the device and the API may be used by the device to execute the transformation.

In an example, an SLO corresponding to an SLA may be determined for the dataflow of the service to the device and the SLO may be compared to the operating metric. The transformation request may be transmitted at least in part based on a result of the comparison. In another example, a second value may be determined for a second operating metric for the edge computing node and the first value and the second value may be compared to a service delivery performance matrix for the service. The transformation may be selected from the set of transformations based on a result of the comparison and the transformation may cause the device to perform an adaption related to the second operating metric.

In an example, it may be determined that execution of a workload associated with the service has moved from the edge computing node to a second edge computing node. A second value may be determined for the operating metric for the second edge computing node and a secondary transformation request may be transmitted to the device based on the second value. The transformation request may cause the device to execute a transformation of the set of transformation to transform the dataflow of the service by the second edge computing node.

ADDITIONAL NOTES & EXAMPLES

Example 1 is a method for adaptive dataflow in a network for an edge computing system, comprising: receiving a transformation compatibility indication from a device; determining a set of transformations available for use by the device connected to the network based on the transformation compatibility indicator; transmitting the set of transformations to the device; determining a value for an operating metric for an edge computing node of the network, the edge computing node providing a service to the device via the network; and transmitting a transformation request to the device based on the value, wherein the transformation request causes the device to execute a transformation of the set of transformations to transform a dataflow of the service.

In Example 2, the subject matter of Example 1 includes, registering the device with a registration service of the edge computing system to allow the device to utilize the service, wherein the transformation compatibility indicator is received during registration.

In Example 3, the subject matter of Examples 1-2 includes, wherein each transformation of the set of transformations includes instructions to cause the device to perform operations to adapt a delivery component of the service.

In Example 4, the subject matter of Examples 1-3 includes, wherein the set of transformations includes one or more of: a bit rate transformation, a data collection transformation, a data granularity transformation, a transmission timing transformation, a buffering transformation, a compression transformation, or a prefetch transformation.

In Example 5, the subject matter of Examples 1-4 includes, wherein the operating metric includes one or more of: a latency metric, a distance metric, a network congestion metric, or a bandwidth metric.

In Example 6, the subject matter of Examples 1-5 includes, predicting a future value for the operating metric for a forward edge computing node predicted to provide the service to the device for a future time period; and selecting a transformation from the set of transformations based on the future value, wherein the transformation request includes instructions for executing the selected transformation while the service is being delivered by the forward edge computing node.

In Example 7, the subject matter of Examples 1-6 includes, wherein the operating metric is a measure of operating performance between the edge computing node and the device.

In Example 8, the subject matter of Examples 1-7 includes, wherein the transformation instructs the device to process at least a portion of a workload associated with the service.

In Example 9, the subject matter of Examples 1-8 includes, training a network model for edge computing nodes of the network using a set of training operating metrics collected from the edge computing nodes; and evaluating the service and the edge computing node using the network model to establish the operating metric.

In Example 10, the subject matter of Examples 1-9 includes, wherein entities of the network operate according to a Multi-access Edge Computing (MEC) standard provided according to a European Telecommunications Standards Institute (ETSI) standard.

In Example 11, the subject matter of Examples 1-10 includes, transmitting an Application Programming Interface (API) to the device, wherein the API is used by the device to execute the transformation.

In Example 12, the subject matter of Examples 1-11 includes, determining a Service Level Objective (SLO) for the dataflow of the service to the device; and comparing the SLO to the operating metric, wherein the transformation request is transmitted at least in part based on a result of the comparing.

In Example 13, the subject matter of Examples 1-12 includes, determining a second value for a second operating metric for the edge computing node; and comparing the value and the second value to a service delivery performance matrix for the service, wherein the transformation is selected from the set of transformations based on a result of the comparison, and wherein the transformation causes the device to perform an adaption related to the second operating metric.

In Example 14, the subject matter of Examples 1-13 includes, determining that execution of a workload associated with the service has moved from the edge computing node to a second edge computing node; determining a second value for the operating metric for the second edge computing node; and transmitting a secondary transformation request to the device based on the second value, wherein the transformation request causes the device to execute a transformation of the set of transformation to transform the dataflow of the service by the second edge computing node.

Example 15 is at least one machine-readable medium including instructions or stored data which may be configured into instructions that, when configured and executed by a machine, cause the machine to perform any method of Examples 1-14.

Example 16 is a system comprising means to perform any method of Examples 1-14.

Example 17 is a system for adaptive dataflow in a network for an edge computing system, comprising: at least one processor; and memory including instructions that, when executed by the at least one processor, cause the at least one processor to perform operations to: receive a transformation compatibility indication from a device; determine a set of transformations available for use by the device connected to the network based on the transformation compatibility indicator; transmit the set of transformations to the device; determine a value for an operating metric for an edge computing node of the network, the edge computing node providing a service to the device via the network; and transmit a transformation request to the device based on the value, wherein the transformation request causes the device to execute a transformation of the set of transformations to transform a dataflow of the service.

In Example 18, the subject matter of Example 17 includes, the memory further comprising instructions that cause the at least one processor to register the device with a registration service of the edge computing system to allow the device to utilize the service, wherein the transformation compatibility indicator is received during registration.

In Example 19, the subject matter of Examples 17-18 includes, wherein each transformation of the set of transformations includes instructions to cause the device to perform operations to adapt a delivery component of the service.

In Example 20, the subject matter of Examples 17-19 includes, wherein the set of transformations includes one or more of: a bit rate transformation, a data collection transformation, a data granularity transformation, a transmission timing transformation, a buffering transformation, a compression transformation, or a prefetch transformation.

In Example 21, the subject matter of Examples 17-20 includes, wherein the operating metric includes one or more of: a latency metric, a distance metric, a network congestion metric, or a bandwidth metric.

In Example 22, the subject matter of Examples 17-21 includes, the memory further comprising instructions that cause the at least one processor to perform operations to: predict a future value for the operating metric for a forward edge computing node predicted to provide the service to the device for a future time period; and select a transformation from the set of transformations based on the future value, wherein the transformation request includes instructions for executing the selected transformation while the service is being delivered by the forward edge computing node.

In Example 23, the subject matter of Examples 17-22 includes, wherein the operating metric is a measure of operating performance between the edge computing node and the device.

In Example 24, the subject matter of Examples 17-23 includes, wherein the transformation instructs the device to process at least a portion of a workload associated with the service.

In Example 25, the subject matter of Examples 17-24 includes, the memory further comprising instructions that cause the at least one processor to perform operations to: train a network model for edge computing nodes of the network using a set of training operating metrics collected from the edge computing nodes; and evaluate the service and the edge computing node using the network model to establish the operating metric.

In Example 26, the subject matter of Examples 17-25 includes, wherein entities of the network operate according to a Multi-access Edge Computing (MEC) standard provided according to a European Telecommunications Standards Institute (ETSI) standard.

In Example 27, the subject matter of Examples 17-26 includes, the memory further comprising instructions that cause the at least one processor to transmit an Application Programming Interface (API) to the device, wherein the API is used by the device to execute the transformation.

In Example 28, the subject matter of Examples 17-27 includes, the memory further comprising instructions that cause the at least one processor to perform operations to: determine a Service Level Objective (SLO) for the dataflow of the service to the device; and compare the SLO to the operating metric, wherein the transformation request is transmitted at least in part based on a result of the comparison.

In Example 29, the subject matter of Examples 17-28 includes, the memory further comprising instructions that cause the at least one processor to perform operations to: determine a second value for a second operating metric for the edge computing node; and compare the value and the second value to a service delivery performance matrix for the service, wherein the transformation is selected from the set of transformations based on a result of the comparison, and wherein the transformation causes the device to perform an adaption related to the second operating metric.

In Example 30, the subject matter of Examples 17-29 includes, the memory further comprising instructions that cause the at least one processor to perform operations to: determine that execution of a workload associated with the service has moved from the edge computing node to a second edge computing node; determine a second value for the operating metric for the second edge computing node; and transmit a secondary transformation request to the device based on the second value, wherein the transformation request causes the device to execute a transformation of the set of transformation to transform the dataflow of the service by the second edge computing node.

In Example 31, the subject matter of Examples 17-30 includes, wherein the set of transformations are transmitted via network interface circuitry of an edge node operating on the network.

In Example 32, the subject matter of Examples 17-31 includes, wherein the device is communicatively coupled to the network via network interface circuitry.

In Example 33, the subject matter of Examples 17-32 includes, wherein the communication between the network and the device is secured using roots of trust.

In Example 34, the subject matter of Example 33 includes, wherein the roots of trust uses attestation to verify trustworthiness of the set of transformations.

Example 35 is at least one non-transitory machine-readable medium including instructions for adaptive dataflow in a network for an edge computing system that, when executed by processing circuitry, cause the processing circuitry to perform operations to: obtain a transformation compatibility indication from a device; determine a set of transformations available for use by the device connected to the network based on the transformation compatibility indicator; transmit the set of transformations to the device; determine a value for an operating metric for an edge computing node of the network, the edge computing node providing a service to the device via the network; and transmit a transformation request to the device based on the value, wherein the transformation request causes the device to execute a transformation of the set of transformations to transform a dataflow of the service.

In Example 36, the subject matter of Example 35 includes, instructions that cause the at least one processor to register the device with a registration service of the edge computing system to allow the device to utilize the service, wherein the transformation compatibility indicator is received during registration.

In Example 37, the subject matter of Examples 35-36 includes, wherein each transformation of the set of transformations includes instructions to cause the device to perform operations to adapt a delivery component of the service.

In Example 38, the subject matter of Examples 35-37 includes, wherein the set of transformations includes one or more of: a bit rate transformation, a data collection transformation, a data granularity transformation, a transmission timing transformation, a buffering transformation, a compression transformation, or a prefetch transformation.

In Example 39, the subject matter of Examples 35-38 includes, wherein the operating metric includes one or more of: a latency metric, a distance metric, a network congestion metric, or a bandwidth metric.

In Example 40, the subject matter of Examples 35-39 includes, instructions that cause the at least one processor to perform operations to: predict a future value for the operating metric for a forward edge computing node predicted to provide the service to the device for a future time period; and select a transformation from the set of transformations based on the future value, wherein the transformation request includes instructions for executing the selected transformation while the service is being delivered by the forward edge computing node.

In Example 41, the subject matter of Examples 35-40 includes, wherein the operating metric is a measure of operating performance between the edge computing node and the device.

In Example 42, the subject matter of Examples 35-41 includes, wherein the transformation instructs the device to process at least a portion of a workload associated with the service.

In Example 43, the subject matter of Examples 35-42 includes, instructions that cause the at least one processor to perform operations to: train a network model for edge computing nodes of the network using a set of training operating metrics collected from the edge computing nodes; and evaluate the service and the edge computing node using the network model to establish the operating metric.

In Example 44, the subject matter of Examples 35-43 includes, wherein entities of the network operate according to a Multi-access Edge Computing (MEC) standard provided according to a European Telecommunications Standards Institute (ETSI) standard.

In Example 45, the subject matter of Examples 35-44 includes, instructions that cause the at least one processor to transmit an Application Programming Interface (API) to the device, wherein the API is used by the device to execute the transformation.

In Example 46, the subject matter of Examples 35-45 includes, instructions that cause the at least one processor to perform operations to: determine a Service Level Objective (SLO) for the dataflow of the service to the device; and compare the SLO to the operating metric, wherein the transformation request is transmitted at least in part based on a result of the comparison.

In Example 47, the subject matter of Examples 35-46 includes, instructions that cause the at least one processor to perform operations to: determine a second value for a second operating metric for the edge computing node; and compare the value and the second value to a service delivery performance matrix for the service, wherein the transformation is selected from the set of transformations based on a result of the comparison, and wherein the transformation causes the device to perform an adaption related to the second operating metric.

In Example 48, the subject matter of Examples 35-47 includes, instructions that cause the at least one processor to perform operations to: determine that execution of a workload associated with the service has moved from the edge computing node to a second edge computing node; determine a second value for the operating metric for the second edge computing node; and transmit a secondary transformation request to the device based on the second value, wherein the transformation request causes the device to execute a transformation of the set of transformation to transform the dataflow of the service by the second edge computing node.

Example 49 is a system for adaptive dataflow in a network for an edge computing system, comprising: means for receiving a transformation compatibility indication from a device; means for determining a set of transformations available for use by the device connected to the network based on the transformation compatibility indicator; means for transmitting the set of transformations to the device; means for determining a value for an operating metric for an edge computing node of the network, the edge computing node providing a service to the device via the network; and means for transmitting a transformation request to the device based on the value, wherein the transformation request causes the device to execute a transformation of the set of transformations to transform a dataflow of the service.

In Example 50, the subject matter of Example 49 includes, means for registering the device with a registration service of the edge computing system to allow the device to utilize the service, wherein the transformation compatibility indicator is received during registration.

In Example 51, the subject matter of Examples 49-50 includes, wherein the set of transformations includes one or more of: a bit rate transformation, a data collection transformation, a data granularity transformation, a transmission timing transformation, a buffering transformation, a compression transformation, or a prefetch transformation.

In Example 52, the subject matter of Examples 49-51 includes, wherein the operating metric includes one or more of: a latency metric, a distance metric, a network congestion metric, or a bandwidth metric.

In Example 53, the subject matter of Examples 49-52 includes, means for predicting a future value for the operating metric for a forward edge computing node predicted to provide the service to the device for a future time period; and means for selecting a transformation from the set of transformations based on the future value, wherein the transformation request includes instructions for executing the selected transformation while the service is being delivered by the forward edge computing node.

In Example 54, the subject matter of Examples 49-53 includes, wherein the operating metric is a measure of operating performance between the edge computing node and the device.

In Example 55, the subject matter of Examples 49-54 includes, wherein the transformation instructs the device to process at least a portion of a workload associated with the service.

In Example 56, the subject matter of Examples 49-55 includes, means for training a network model for edge computing nodes of the network using a set of training operating metrics collected from the edge computing nodes; and means for evaluating the service and the edge computing node using the network model to establish the operating metric.

In Example 57, the subject matter of Examples 49-56 includes, wherein entities of the network operate according to a Multi-access Edge Computing (MEC) standard provided according to a European Telecommunications Standards Institute (ETSI) standard.

In Example 58, the subject matter of Examples 49-57 includes, means for transmitting an Application Programming Interface (API) to the device, wherein the API is used by the device to execute the transformation.

In Example 59, the subject matter of Examples 49-58 includes, means for determining a Service Level Objective (SLO) for the dataflow of the service to the device; and means for comparing the SLO to the operating metric, wherein the transformation request is transmitted at least in part based on a result of the comparison.

In Example 60, the subject matter of Examples 49-59 includes, means for determining a second value for a second operating metric for the edge computing node; and means for comparing the value and the second value to a service delivery performance matrix for the service, wherein the transformation is selected from the set of transformations based on a result of the comparison, and wherein the transformation causes the device to perform an adaption related to the second operating metric.

In Example 61, the subject matter of Examples 49-60 includes, means for determining that execution of a workload associated with the service has moved from the edge computing node to a second edge computing node; means for determining a second value for the operating metric for the second edge computing node; and means for transmitting a secondary transformation request to the device based on the second value, wherein the transformation request causes the device to execute a transformation of the set of transformation to transform the dataflow of the service by the second edge computing node.

Example 62 is an apparatus for adaptive dataflow in a network for an edge computing system, comprising: at least one processor; and memory including instructions that, when executed by the at least one processor, cause the at least one processor to perform operations to: transmit a transformation compatibility indication to a registration service of the edge computing system; receive a set of transformations based on the transformation compatibility indicator; receive a value for an operating metric for an edge computing node of the network, the edge computing node providing a service to the apparatus via the network; and select a transformation from the set of transformations based on the value; and execute the transformation to transform a dataflow of the service.

In Example 63, the subject matter of Example 62 includes, wherein the set of transformations includes one or more of: a bit rate transformation, a data collection transformation, a data granularity transformation, a transmission timing transformation, a buffering transformation, a compression transformation, or a prefetch transformation.

In Example 64, the subject matter of Examples 62-63 includes, wherein the operating metric includes one or more of: a latency metric, a distance metric, a network congestion metric, or a bandwidth metric.

In Example 65, the subject matter of Examples 62-64 includes, wherein the operating metric is a measure of operating performance between the edge computing node and the apparatus.

In Example 66, the subject matter of Examples 62-65 includes, wherein the transformation local execution of at least a portion of a workload associated with the service.

In Example 67, the subject matter of Examples 62-66 includes, wherein entities of the network operate according to a Multi-access Edge Computing (MEC) standard provided according to a European Telecommunications Standards Institute (ETSI) standard.

In Example 68, the subject matter of Examples 62-67 includes, the memory further comprising instructions that cause the at least one processor to perform operations to: receive an Application Programming Interface (API) from a node of the edge computing system; and execute the transformation using the API.

Example 69 is a method for adaptive dataflow in a network for an edge computing system, comprising: transmitting a transformation compatibility indication to a registration service of the edge computing system; receiving a set of transformations based on the transformation compatibility indicator; receiving a value for an operating metric for an edge computing node of the network, the edge computing node providing a service to the method via the network; and selecting a transformation from the set of transformations based on the value; and executing the transformation to transform a dataflow of the service.

In Example 70, the subject matter of Example 69 includes, wherein the set of transformations includes one or more of: a bit rate transformation, a data collection transformation, a data granularity transformation, a transmission timing transformation, a buffering transformation, a compression transformation, or a prefetch transformation.

In Example 71, the subject matter of Examples 69-70 includes, wherein the operating metric includes one or more of: a latency metric, a distance metric, a network congestion metric, or a bandwidth metric.

In Example 72, the subject matter of Examples 69-71 includes, wherein the operating metric is a measure of operating performance between the edge computing node and the method.

In Example 73, the subject matter of Examples 69-72 includes, wherein the transformation local execution of at least a portion of a workload associated with the service.

In Example 74, the subject matter of Examples 69-73 includes, wherein entities of the network operate according to a Multi-access Edge Computing (MEC) standard provided according to a European Telecommunications Standards Institute (ETSI) standard.

In Example 75, the subject matter of Examples 69-74 includes, receiving an Application Programming Interface (API) from a node of the edge computing system; and executing the transformation using the API.

Example 76 may include one or more computer-readable storage media comprising data to cause an electronic device, upon loading, execution, configuration, or provisioning of the data by one or more processors or electronic circuitry of the electronic device, to perform one or more elements of a method described in or related to any of Examples 1-75.

Example 77 is an apparatus comprising means to implement of any of Examples 1-75.

Example 78 is a system to implement of any of Examples 1-75.

Example 79 is a method to implement of any of Examples 1-75.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B." unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for adaptive dataflow in a network for an edge computing system, comprising:
at least one processor; and
memory including instructions that, when executed by the at least one processor, cause the at least one processor to perform operations to:
receive a transformation compatibility indication from an endpoint device;
determine a set of transformation functions executable by the endpoint device connected to the network based on the transformation compatibility indication;
transmit the set of transformation functions to the endpoint device;
determine values for an operating metric for a first edge computing node and a second edge computing node of the network, the first and second edge computing nodes providing a service to the endpoint device via the network, the first and second edge computing nodes disposed along a route that the endpoint device traverses, wherein the first edge computing node is to provide the service at a first time and at a first location and the second edge computing node is to provide the service at a second time and at a second location after the service is migrated from the first edge computing node to the second edge computing node;

transmit a first transformation request to the endpoint device based on the value of the operating metric corresponding to the first edge computing node, wherein the first transformation request causes the endpoint device to execute a first transformation function of the set of transformation functions to modify sensed data before transmitting to the first edge computing node to alter the value of the operating metric; and transmit a second transformation request to the endpoint device, which causes the endpoint device to execute a second transformation function of the set of transformation functions to modify sensed data in a different way before transmitting to the second edge computing node to further alter the value of the operating metric.

2. The system of claim 1, the memory further comprising instructions that cause the at least one processor to perform operations to:
predict a future value for the operating metric for a forward edge computing node predicted to provide the service to the endpoint device for a future time period; and
select a transformation function from the set of transformation functions based on the future value, wherein the transformation request includes instructions for executing the transformation function while the service is being delivered by the forward edge computing node.

3. The system of claim 1, wherein the operating metric is a measure of operating performance between the first edge computing node and the endpoint device.

4. The system of claim 1, wherein the first transformation function instructs the endpoint device to process at least a portion of a workload associated with the service.

5. The system of claim 1, the memory further comprising instructions that cause the at least one processor to perform operations to:
determine a Service Level Objective (SLO) for the dataflow of the service to the endpoint device; and
compare the SLO to the operating metric, wherein the first transformation request is transmitted at least in part based on a result of the comparison.

6. The system of claim 1, the memory further comprising instructions that cause the at least one processor to perform operations to:
determine a second value for a second operating metric for the first edge computing node; and
compare the value and the second value to a service delivery performance matrix for the service, wherein the first transformation function is selected from the set of transformation functions based on a result of the comparison, and wherein the first transformation function causes the endpoint device to perform an adaption related to the second operating metric.

7. The system of claim 1, wherein to modify sensed data, the first transformation function is to change the data from a first format to a second format.

8. The system of claim 1, wherein to modify sensed data, the first transformation function is to change the data from a higher resolution to a lower resolution.

9. The system of claim 1, wherein to modify sensed data, the first transformation function is to change the data from a higher bit rate to a lower bit rate.

10. At least one non-transitory machine-readable medium including instructions for adaptive dataflow in a network for an edge computing system that, when executed by processing circuitry, cause the processing circuitry to perform operations to:
obtain a transformation compatibility indication from an endpoint device;
determine a set of transformation functions executable by the endpoint device connected to the network based on the transformation compatibility indication;
transmit the set of transformation functions to the endpoint device;
determine values for an operating metric for a first edge computing node and a second edge computing node of the network, the first and second edge computing nodes providing a service to the endpoint device via the network, the first and second edge computing nodes disposed along a route that the endpoint device traverses, wherein the first edge computing node is to provide the service at a first time and at a first location and the second edge computing node is to provide the service at a second time and at a second location after the service is migrated from the first edge computing node to the second edge computing node;
transmit a first transformation request to the endpoint device based on the value of the operating metric corresponding to the first edge computing node, wherein the first transformation request causes the endpoint device to execute a first transformation function of the set of transformation functions to modify sensed data before transmitting to the first edge computing node to alter the value of the operating metric; and
transmit a second transformation request to the endpoint device, which causes the endpoint device to execute a second transformation function of the set of transformation functions to modify sensed data in a different way before transmitting to the second edge computing node to further alter the value of the operating metric.

11. The at least one non-transitory machine-readable medium of claim 10, further comprising instructions that cause the processing circuitry to perform operations to:
predict a future value for the operating metric for a forward edge computing node predicted to provide the service to the endpoint device for a future time period; and
select a transformation function from the set of transformation functions based on the future value, wherein the transformation request includes instructions for executing the transformation function while the service is being delivered by the forward edge computing node.

12. The at least one non-transitory machine-readable medium of claim 10, wherein the operating metric is a measure of operating performance between the first edge computing node and the endpoint device.

13. The at least one non-transitory machine-readable medium of claim 10, wherein the first transformation function instructs the endpoint device to process at least a portion of a workload associated with the service.

14. The at least one non-transitory machine-readable medium of claim 10, further comprising instructions that cause the processing circuitry to perform operations to:
- determine a Service Level Objective (SLO) for the dataflow of the service to the endpoint device; and
- compare the SLO to the operating metric, wherein the first transformation request is transmitted at least in part based on a result of the comparison.

15. The at least one non-transitory machine-readable medium of claim 10, further comprising instructions that cause the processing circuitry to perform operations to:
- determine a second value for a second operating metric for the first edge computing node; and
- compare the value and the second value to a service delivery performance matrix for the service, wherein the first transformation function is selected from the set of transformation functions based on a result of the comparison, and wherein the first transformation function causes the endpoint device to perform an adaption related to the second operating metric.

16. An apparatus for adaptive dataflow in a network for an edge computing system, comprising:
- at least one processor; and
- memory including instructions that, when executed by the at least one processor, cause the at least one processor to perform operations to:
  - transmit a transformation compatibility indication to a registration service of the edge computing system;
  - receive a set of transformation functions based on the transformation compatibility indication;
  - receive values for an operating metric for a first edge computing node and a second edge computing node of the network, the first and second edge computing nodes providing a service to the apparatus via the network, the first and second edge computing nodes disposed along a route that the apparatus is to traverse, wherein the first edge computing node is to provide the service at a first time and at a first location and the second edge computing node is to provide the service at a second time and at a second location after the service is migrated from the first edge computing node to the second edge computing node;
  - select a first transformation function of the set of transformation functions based on the value of the operating metric, the first transformation function to modify sensed data before transmitting the modified sensed data to the first edge computing node;
  - execute the transformation function to modify the sensed data to alter the value of the operating metric;
  - select a second transformation function of the set of transformation functions based on the value of the operating metric, the second transformation function to modify sensed data in a different way before transmitting the modified sensed to the second edge computing node; and
  - execute the second transformation function to modify the sensed data to further alter the value of the operating metric.

17. The apparatus of claim 16, wherein the set of transformation functions includes one or more of: a bit rate transformation, a data collection transformation, a data granularity transformation, a transmission timing transformation, a buffering transformation, a compression transformation, or a prefetch transformation.

18. The apparatus of claim 16, wherein the operating metric includes one or more of: a latency metric, a distance metric, a network congestion metric, or a bandwidth metric.

19. The apparatus of claim 16, wherein the operating metric is a measure of operating performance between the first edge computing node and the apparatus.

20. The apparatus of claim 16, wherein the first transformation function includes instructions for local execution of at least a portion of a workload associated with the service.

21. The apparatus of claim 16, the memory further comprising instructions that cause the at least one processor to perform operations to:
- receive an Application Programming Interface (API) from a node of the edge computing system; and
- execute the first transformation function using the API.

22. A method for adaptive dataflow in a network for an edge computing system, comprising:
- receiving a transformation compatibility indication from an endpoint device;
- determining a set of transformation functions executable by the endpoint device connected to the network based on the transformation compatibility indication;
- transmitting the set of transformation functions to the endpoint device;
- determining values for an operating metric for a first edge computing node and a second edge computing node of the network, the first and second edge computing nodes providing a service to the endpoint device via the network, the first and second edge computing nodes disposed along a route that the endpoint device traverses, wherein the first edge computing node is to provide the service at a first time and at a first location and the second edge computing node is to provide the service at a second time and at a second location after the service is migrated from the first edge computing node to the second edge computing node;
- transmitting a first transformation request to the endpoint device based on the value of the operating metric corresponding to the first edge computing node, wherein the first transformation request causes the endpoint device to execute a first transformation function of the set of transformation functions to modify sensed data before transmitting to the first edge computing node to alter the value of the operating metric; and
- transmitting a second transformation request to the endpoint device, which causes the endpoint device to execute a second transformation function of the set of transformation functions to modify sensed data in a different way before transmitting to the second edge computing node to further alter the value of the operating metric.

23. The method of claim 22, further comprising:
- predicting a future value for the operating metric for a forward edge computing node predicted to provide the service to the endpoint device for a future time period; and
- selecting a transformation function from the set of transformation functions based on the future value, wherein the transformation request includes instructions for executing the transformation function while the service is being delivered by the forward edge computing node.

24. The method of claim 22, wherein the operating metric is a measure of operating performance between the first edge computing node and the endpoint device.

25. The method of claim 22, wherein the first transformation function instructs the endpoint device to process at least a portion of a workload associated with the service.

26. The method of claim 22, further comprising:
- determining a Service Level Objective (SLO) for the dataflow of the service to the endpoint device; and
- comparing the SLO to the operating metric, wherein the first transformation request is transmitted at least in part based on a result of the comparing.

27. The method of claim 22, further comprising:
- determining a second value for a second operating metric for the first edge computing node; and
- comparing the value and the second value to a service delivery performance matrix for the service, wherein the first transformation function is selected from the set of transformation functions based on a result of the comparison, and wherein the first transformation function causes the endpoint device to perform an adaption related to the second operating metric.

* * * * *